United States Patent
Zuidhof et al.

(10) Patent No.: US 10,506,793 B2
(45) Date of Patent: Dec. 17, 2019

(54) SYSTEM AND METHOD FOR FEEDING ANIMALS

(71) Applicant: PRECISIONZX INC., Edmonton (CA)

(72) Inventors: Martin Jacob Zuidhof, Edmonton (CA); Mark Vernon Fedorak, Edmonton (CA); Christopher Charles Kirchen, Sherwood Park (CA); Edmond Hok Ming Lou, Edmonton (CA); Christopher Anton Ouellette, Edmonton (CA); Irene Isabel Wenger, Edmonton (CA)

(73) Assignee: PRECISIONZX INC., Edmonton, Alberta (CA)

( * ) Notice: Subject to any disclaimer, the term of this patent is extended or adjusted under 35 U.S.C. 154(b) by 298 days.

(21) Appl. No.: 15/283,125

(22) Filed: Sep. 30, 2016

(65) Prior Publication Data

US 2018/0092331 A1    Apr. 5, 2018

(51) Int. Cl.
  *A01K 5/02*    (2006.01)
  *A01K 5/01*    (2006.01)

(52) U.S. Cl.
  CPC .............. *A01K 5/0142* (2013.01); *A01K 5/02* (2013.01); *A01K 5/0291* (2013.01)

(58) Field of Classification Search
  CPC ...... A01K 5/0114; A01K 5/02; A01K 5/0233; A01K 5/0291
  USPC .......... 119/51.02, 51.11, 51.12, 53, 53.5, 54, 119/56.1, 57.1, 57.92
  See application file for complete search history.

(56) References Cited

U.S. PATENT DOCUMENTS

| 3,810,442 | A | * | 5/1974 | Jacobs | ..................... A01K 1/12 119/14.03 |
| 4,280,448 | A | * | 7/1981 | Ostermann | .......... A01K 1/0023 119/842 |
| 4,517,923 | A | | 5/1985 | Palmer | |
| 4,617,876 | A | | 10/1986 | Hayes | |

(Continued)

FOREIGN PATENT DOCUMENTS

| CA | 2 241 206 A1 | 12/1999 |
| WO | 2009090250 A1 | 7/2009 |

OTHER PUBLICATIONS

International Search Report, Written Opinion of the International Searching Authority, and Examination Notes of the CIPO (ISA) for PCT/CA2016/051144, Jun. 15, 2017.

(Continued)

*Primary Examiner* — David J Parsley
(74) *Attorney, Agent, or Firm* — James A. Sheridan; Sheridan Law, LLC

(57) ABSTRACT

A feeding system is provided to permit sequential entry to animals, one at a time, into a feeding station that weighs the animal, and then provides or prevents access to feed based on body weight or other criteria. It exits each animal if no feed is to be provided, or after feeding for a specified period of time. The system accommodates animals housed in groups, and allows individual animals to be fed precisely with minimal labour input. Feed consumption by individual animals is limited by the amount of time they remain in the feeding area of the station and the amount of feed provided to them. The system provides for the ongoing collection of data about the animals growth and controls and monitors feed intake and body weight.

32 Claims, 23 Drawing Sheets

(56) References Cited

U.S. PATENT DOCUMENTS

| | | | |
|---|---|---|---|
| 5,275,131 A | 1/1994 | Brake et al. | |
| 5,673,647 A | 10/1997 | Pratt | |
| 5,826,538 A * | 10/1998 | Roybal | A01K 5/0291 |
| | | | 119/51.12 |
| 5,996,529 A * | 12/1999 | Sissom | A01J 5/01 |
| | | | 119/14.14 |
| 6,234,111 B1 | 5/2001 | Ulman et al. | |
| 6,314,909 B1 | 11/2001 | Horwood | |
| 6,509,375 B1 | 1/2003 | Meier et al. | |
| 6,664,897 B2 * | 12/2003 | Pape | A01K 29/005 |
| | | | 119/51.02 |
| 6,868,804 B1 | 3/2005 | Huisma et al. | |
| 6,901,885 B1 | 6/2005 | Kleinsasser | |
| 7,040,250 B2 | 5/2006 | Cole et al. | |
| 7,210,428 B2 | 5/2007 | Thibault | |
| 7,444,961 B1 * | 11/2008 | Ellis | A01K 1/0613 |
| | | | 119/840 |
| 7,581,512 B2 | 9/2009 | Cole et al. | |
| 8,091,507 B2 | 1/2012 | Cole et al. | |
| 8,584,619 B2 | 11/2013 | Eakin et al. | |
| 8,683,946 B2 * | 4/2014 | Hofman | A01J 5/0175 |
| | | | 119/14.02 |
| 2002/0174834 A1 | 11/2002 | van den Berg | |
| 2003/0061996 A1 | 4/2003 | Voogd et al. | |
| 2005/0284382 A1 | 12/2005 | Stantchev et al. | |
| 2006/0249088 A1 | 11/2006 | Eu | |
| 2007/0137584 A1 | 6/2007 | Travis | |
| 2007/0181068 A1 | 8/2007 | McKeown | |
| 2007/0193524 A1 | 8/2007 | Turner et al. | |
| 2008/0314325 A1 | 12/2008 | Hempstead et al. | |
| 2009/0133635 A1 | 5/2009 | Sie et al. | |
| 2009/0173282 A1 | 7/2009 | Wu et al. | |
| 2009/0241840 A1 | 10/2009 | Mills | |
| 2010/0263596 A1 | 10/2010 | Schumann et al. | |
| 2011/0168099 A1 | 7/2011 | Van Lier et al. | |
| 2012/0085288 A1 | 4/2012 | Salinas et al. | |
| 2013/0036977 A1 | 2/2013 | Kalnay et al. | |
| 2014/0000522 A1 | 1/2014 | Christensen | |

OTHER PUBLICATIONS

Aviagen Research & Development—FCR Selection, http://en.aviagen.com/about-us/research-development/, accessed Aug. 4, 2014.

Zuidhof et al., "Effects of broiler breeder management on pullet body weight and carcass uniformity," Poult. Sci. 94: 1389-1397 (2015).

Havenstein et al., "Carcass composition and yield of 1957 versus 2001 broilers when fed representative 1957 and 2001 broiler diets," Poult. Sci. 82: 1509-1518 (2003).

Havenstein et al., "Growth, livability, and feed conversion of 1957 versus 2001 broilers when fed representative 1957 and 2001 broiler diets," Poult. Sci. 82: 1500-1508 (2003).

Havenstein et al., "Growth, livability, and feed conversion of 1957 vs 1991 broilers when fed "typical" 1957 and 1991 broiler diets," Poult. Sci. 73: 1785-1794 (1994).

Havenstein et al., "Carcass composition and yield of 1991 vs 1957 broilers when fed "typical" 1957 and 1991 broiler diets," Poult. Sci. 73: 1795-1804 (1994).

Qureshi et al., "A comparison of the immune performance of a 1991 commercial broiler with a 1957 randombred strain when fed "typical" 1957 and 1991 broiler diets," Poult. Sci. 73: 1805-1812 (1994).

Robinson et al., "Effects of photostimulatory lighting and feed allocation in female broiler breeders. 2. Egg and chick production characteristics," Can. J. Anim. Sci. 78: 615-623 (1998).

Zuidhof et al., "Growth, efficiency, and yield of commercial broilers from 1957, 1978, and 2005," Poult. Sci. 93: 2970-2982 (2014).

* cited by examiner

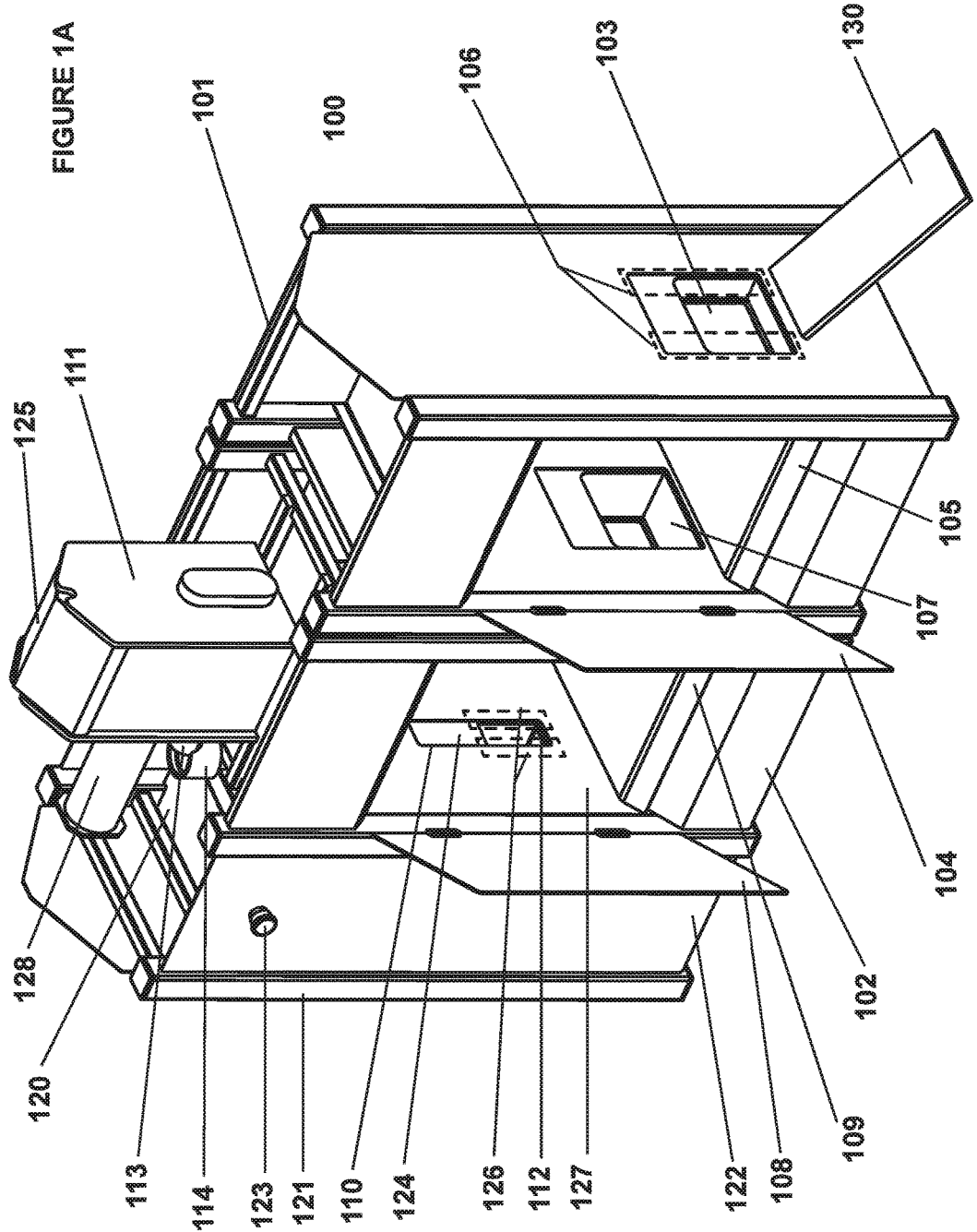

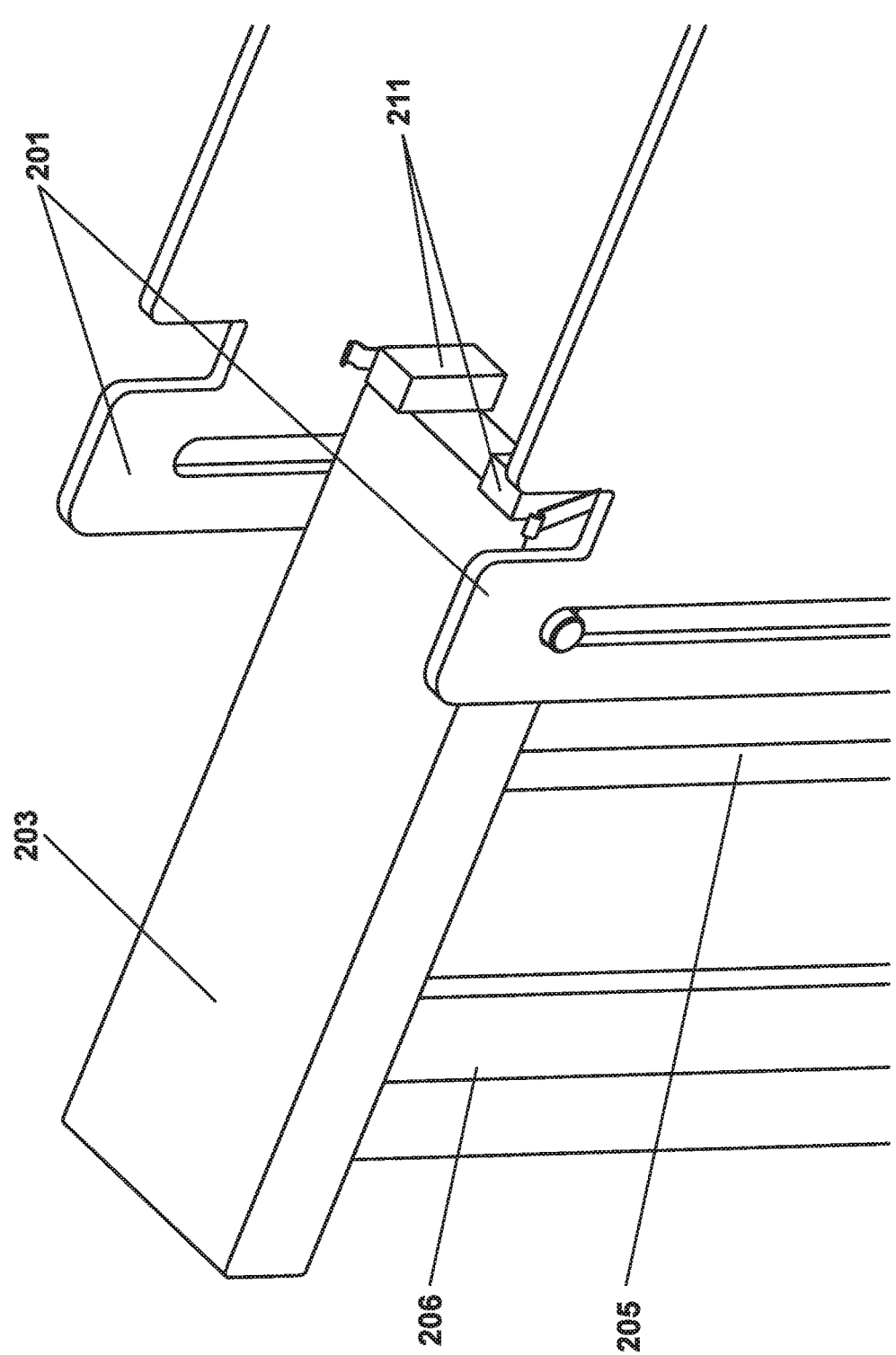

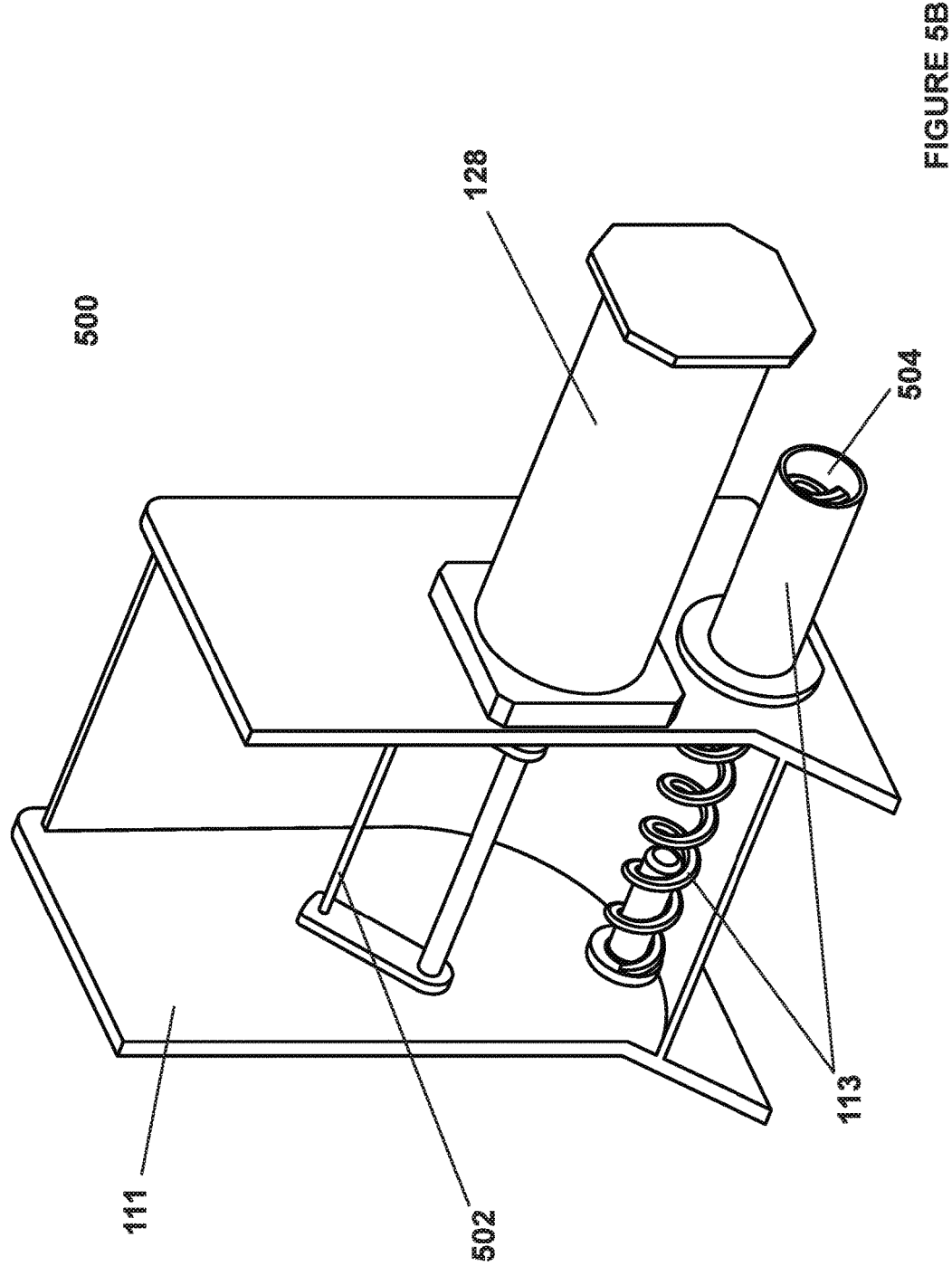

SYSTEM AND METHOD FOR FEEDING ANIMALS

TECHNICAL FIELD

The present disclosure is related to the field of providing the right quantity of feed to individual animals, in particular, meat-type poultry breeding stock that are intended to follow a predetermined body weight profile, or pets to prevent or treat obesity.

BACKGROUND

Meat type chicken parent (broiler breeders), grandparent, great grandparent and pedigree stock have the genetic potential for accelerated growth due to selection for growth rate, meat yield, and feed efficiency since the 1940's (Havenstein et al., 1994a; 1994b; 2003a, 2003b; Zuidhof et al. 2014). These breeding stocks must be maintained using strict feed rationing to control body weight because even moderate overfeeding reduces reproductive performance (Robinson et al. 1998). Each year, the problem becomes greater due to increasing incongruity between the body weight required for reproductive success and the genetic potential of their offspring.

Commercially, feed allocation decisions for broiler breeders are a significant challenge. Changes in dietary ingredient composition, environmental temperature, and the activity level of the animals are factors in the decision about what to feed, so as to ensure tight control of body weight. Further, even if correct feed amounts are provided, equal distribution to birds in the flock is difficult because of competition for a limited amount of feed (Zuidhof et al., 2014). Even if the average body weight of a flock is close to target, poor uniformity is becoming a serious problem because more aggressive animals eat more and become overweight, while less aggressive ones become underweight. Both scenarios reduce health, welfare, and reproductive success. State of the art in feeding broiler breeders currently involves specialized feed pans (Cole et al., 2009; 2012) and restriction grills that allow for sex-separate feeding (Brake et al., 1994) and feed distribution systems that permit weighing feed for females and males separately (Horwood, 2001). All of these challenges apply to various extents to any animal requiring some degree of feed restriction to control body weight or condition.

In some regions of the world where labor is relatively inexpensive, flock uniformity is managed by continually sorting animals into groups with similar body weight ranges. This approach has been automated for some livestock applications (Thibault et al., 2007), but does not address the issue in broiler breeders of intense competition for feed. For poultry, no similar precision feeding system exists anywhere in the world. There is no commercial feeding system anywhere for broiler breeders that provides feed based on real-time feedback about the body weight of individual animals and how that weight compares to the targets established by primary breeders.

Primary breeders and researchers need accurate and complete measures of feed intake to measure efficiency and understand feeding behaviour and energy metabolism rhythms as affected by feed intake patterns. Some prior art feeding systems include the following.

For poultry, Aviagen (Aviagen, 2014), Cobb-Vantress (Ken Semon, personal communication), and Hybrid Turkeys (Ben Wood, personal communication) have developed proprietary feeding systems that monitor individual feed intake, which are used for selecting for efficiency in free run meat-type poultry. These systems do not control feed intake, but simply monitor it.

For cattle, Growsafe has a similar system for cattle that monitors individual feed and water intake. It is used primarily to identify efficient phenotypes in cattle (Huisma et al., 2005). The Growsafe system monitors, but does not control feed intake, and is designed for much larger animals, such as cattle. There are also sorting systems for dairy cattle; however, these systems are large and unsuitable for small animals.

For swine, electronic sow feeding systems (Eakin et al., 2012) weigh and feed animals, but the animal access is completely different. It is unsuitable for smaller animals such as poultry and small pets, and requires pre-programming of individual animal characteristics and nutritional requirements into the system.

For pets, some pet feeding devices are similar, but like the systems for pigs and dairy cattle, they require programming a feed dosage or feeding duration rather than relying on direct feedback in the form of real-time body weight data (e.g. McKeown, 2007; Stanchev et al., 2005; Wu et al., 2009).

The duty cycle of the mechanical parts of feeding stations is high. Mechanical failure may cause feed interruptions and undesirable behaviours, particularly once the stations return to function after repair. The design must facilitate rapid and easy repairs by farmers and technicians. Doors and ejectors must operate smoothly, allow and exclude access reliably, and prevent injury when moving. Scales must be accurate and free of vibration. The feeder must be reliable and minimize spillage.

It is, therefore, desirable to provide a method and system for feeding animals, such as poultry, that overcomes the shortcomings of the prior art.

SUMMARY

In some embodiments, a system and method can be provided for precisely providing the right quantity of feed to individual animals. The animals do not need to be housed individually, thus the scope extends to free run and free range housing. The invention can be particularly suited to meat-type poultry breeding stock that are intended to follow a predetermined body weight profile, or pets to prevent or treat obesity. The system can be able to collect high volumes of information of value for managing feed intake and body weight, for research, and for characterizing traits important for genetic selection programs. The system can operate with the aid of at least one feeding station equipped with an integrated scale.

In some embodiments, the system and method can use real-time feedback about each bird's body weight to determine the feed allocation. The system can eliminate the labour component from animal weighing. With an optional multi-feed capability, the system can enable precise control and measurement of feed intake that facilitates body weight control but can also facilitate measures of efficiency in response to any combination of nutrients supplied from 4 different feeders.

Unlike Schumann et al. (2010), in a system designed for pets, the system presented herein does not calculate an amount of feed but, rather, can allow access to feed for a brief period of time, and can then subsequently eject the animal from the feeding area. The system can also protect the animal that is feeding from interference from other animals during the time feed is provided. In some embodiments, the system can be prone to errors due to theoretical calculations not matching the actual required amount of feed, or feed measurement errors. The system can comprise a reliable body weight scale to measure the body weight of an animal, and can allow only minor incremental increases in body weight by providing small meals more frequently.

Precision feeding involves feeding the right animal the right amount of feed of the right composition at the right time. The system and method presented herein is unique from many existing prior art systems in that it can precisely achieve a pre-programmed target body weight, such as those employed by the breeding sector of the poultry meat industry. The system and method controls and monitors body weight and feed intake. In some embodiments, the system and method can have identical functionality for other small livestock, as well as pets such as cats, dogs, birds and rodents.

In some embodiments, the system can comprise a sequential feeding station that can be used to control feed intake according to any criteria that can be programmed into the system. In particular, the system can provide body weight feedback to enable precise body weight control of poultry breeding stock. Commercially, it is expected that the system and method can achieve 100% uniformity, that is, 100% of a flock within 10% of the average flock body weight. For body weight, coefficients of uniformity (CV=standard deviation/mean×100%) from 1 to 3% have been consistently achieved using the system and method presented herein.

In some embodiments, the system can serve both as a data acquisition system for animal research, and as a commercial feeding system, designed particularly for broiler breeders. In some embodiments, each feeding station of the system can allow only one animal to enter at a time. In some embodiments, an optional radio frequency identification system can be provided to identify the individual animal occupying the feeding station. This can allow a system user to relate feeding station usage as well as body weight and feed intake data of each individual animal. The system can include a body weight scale to record the weight of the animal in real time while in a feeding station. The decision whether or not to feed the animal can be software driven, and can use real time feedback (for example, the animal's body weight), or any other decision criteria that can be programmed into the system, such as matching the feed intake of another individual animal, or any specified feed intake pattern. If the animal meets the criteria, the system can allow it access to feed. If the animal does not meet the decision criteria for feeding, it can be ejected from the feeding station. Feed can be provided in a tray that can be optionally suspended on a load cell. A small door can be opened with an actuator to provide access to the feed. The system can measure the rate at which feed disappears from the feeder, and can calculate the total feed intake of each individual animal during each feeding bout. For systems equipped with a hopper and auger, as well as the feed tray load cell, a precise amount of feed can be provided in the feeder prior to opening the feed door. Access duration can be controlled by a software setting, which can regulate the quantity of feed an individual animal can consume in one feeding bout.

In some embodiments, the system and method can provide feed to individual animals in free run systems. The system does not simply monitor feed intake of individual animals, but can control feed intake by allowing or disallowing access to the feeder based on any criteria. For research, this can improve the statistical power of experimental designs because every free run animal can be considered an experimental unit. This is an important consideration for reducing the number of animals required for research. Notably, the system can meet societal demands to reduce housing constraints imposed on animals used for breeding, research or food production.

Overview

In some embodiments, the system and method presented herein can provide a sequential feeding system, meaning that one animal at a time can enter at least one station. Each feeding station can weigh the animal that enters, and can either prevent or allow access to feed based on its body weight relative to a desired body weight at a certain age. Age is normally calculated from the birth or hatch date of an individual or group of individuals. An onboard computer can calculate desired weight from any starting date. Desired or pre-set body weight targets can be entered by a user. In some embodiments, each feeding station can protect individual animals from interference from other animals while eating. Each station can gently eject the animal from the feeding station immediately if the animal should not be fed, or after the user-specified duration of access to feed expires. Time stamped data pertinent to each visit to the station, as well as the decision made (to feed or not to feed), can written to a data file.

Broadly stated, in some embodiments, a system can be provided for feeding an animal, comprising: a frame; a feeding compartment operatively coupled to the frame, further comprising a first entry door configured to control access and ingress into the feeding compartment by the animal, and further comprising at least one first exit door configured to provide egress from the feeding compartment by the animal; a feed delivery system operatively coupled to the feeding compartment and configured to dispense feed to the animal in the feeding compartment; and at least one controller configured to operatively control at least one or more of the first entry door, the at least one first exit door and the feed delivery system.

Broadly stated, in some embodiments, the system can further comprise a sorting compartment operatively coupled to the frame and to the first entry door, the sorting compartment further comprising a second entry door configured to control access and ingress into the sorting compartment by the animal, and further comprising at least one second exit door configured to provide egress from the sorting compartment by the animal, and wherein the at least one controller is further configured to operatively control one or both of the second entry door and the at least one second exit door.

Broadly stated, in some embodiments, the feeding compartment can further comprise a first ejection mechanism configured to eject the animal from the feeding compartment, and wherein the at least one controller is further configured to operatively control the first ejection mechanism.

Broadly stated, in some embodiments, the sorting compartment can further comprise a second ejection mechanism configured to eject the animal from the sorting compartment, and wherein the at least one controller is further configured to operatively control the second ejection mechanism.

Broadly stated, in some embodiments, the first ejection mechanism can comprise a first panel configured to push the animal out of feeding compartment through the at least one first exit door.

Broadly stated, in some embodiments, the second ejection mechanism can comprise a second panel configured to push the animal out of sorting compartment through the at least one second exit door.

Broadly stated, in some embodiments, one or both of the first ejection mechanism and the second ejection mechanism can comprise one or more of a group comprising an air knife, an audio system configured to reproduce startling sounds to the animal, a video system configured to display startling images to the animal, an electric shock system and a heating system configured to dielectrically heat the animal.

Broadly stated, in some embodiments, one or both of the first entry door and the second entry door can comprise a restriction mechanism configured to restrict a size of the animal passing therethrough.

Broadly stated, in some embodiments, one or both of the sorting compartment and the feeding compartment can comprise a scale configured to weigh the animal.

Broadly stated, in some embodiments, one or both of the sorting compartment and the feeding compartment can comprise a radio frequency identification ("RFID") antenna operatively coupled to the at least one controller, the RFID antenna configured to detect an RFID tag disposed on the animal.

Broadly stated, in some embodiments, the feed delivery system can comprise at least one storage bin configured to store the feed, and further comprises a feed dispensing mechanism configured to dispense the feed from the at least one storage bin.

Broadly stated, in some embodiments, the feeding compartment can comprise at least one feed receptacle operatively coupled to the feed dispensing mechanism and configured to receive the feed from the at least one storage bin, and wherein each of the at least one feed receptacle further comprises a feed receptacle door configured to restrict access thereto.

Broadly stated, in some embodiments, the feeding compartment can comprise a marking system configured to mark an unidentified animal.

Broadly stated, in some embodiments, a method can be provided for feeding an animal, the method comprising the steps of: opening a first entry door to a feeding compartment to provide access and ingress into the feeding compartment by the animal, wherein the feeding compartment is operatively coupled to a frame, and wherein the first entry door is operatively controlled by a controller; dispensing feed from a feed delivery system into the feeding compartment if the animal meets at least one predetermined criteria for receiving the feed, the feed delivery system operatively controlled by the controller; and ejecting the animal from the feeding compartment through a first exit door disposed in the feeding compartment if: i) the animal has eaten at least some of the dispensed feed, ii) a predetermined period of time for feeding has expired, or iii) the animal does not meet the at least one predetermined criteria for receiving the feed, wherein the first exit door is operatively controlled by the controller.

Broadly stated, in some embodiments, the method can further comprise the step of restricting access and ingress into the feeding compartment if the animal exceeds a predetermined size.

Broadly stated, in some embodiments, the method can further comprise the step of weighing the animal when the animal is in the feeding compartment.

Broadly stated, in some embodiments, the method can further comprise the step of detecting whether the animal has a radio frequency identification ("RFID") tag and identifying the animal if does.

Broadly stated, in some embodiments, the method can further comprise the step of marking the animal if the animal cannot be identified.

Broadly stated, in some embodiments, the method can further comprise the step of opening a second entry door to a sorting compartment operatively coupled to the frame and to the first entry door to provide access and ingress into the sorting compartment by the animal, wherein the second entry door is operatively controlled by the controller.

Broadly stated, in some embodiments, the method can further comprise the step of ejecting the animal from the sorting compartment through a second exit door disposed in the sorting compartment if the animal does not meet the at least one predetermined criteria for receiving the feed.

Broadly stated, in some embodiments, the method can further comprise the step of restricting access and ingress into the sorting compartment if the animal exceeds the predetermined size.

Broadly stated, in some embodiments, the method can further comprise the step of identifying the animal when the animal is in the sorting compartment.

Broadly stated, in some embodiments, the method can further comprise the step of weighing the animal when the animal is in the sorting compartment.

BRIEF DESCRIPTION OF THE DRAWINGS

FIG. 1A is a perspective view depicting a complete feeding station with a single feed delivery system.

FIG. 2D is a top view depicting the loose coupling and entry door blocked mechanism for a first embodiment of an entry door mechanism utilizing a linear actuator and linear potentiometer.

FIG. 5B is a cut away view depicting a feed storage and delivery mechanism with a single hopper and the internal components thereof.

DETAILED DESCRIPTION OF EMBODIMENTS

Figure 1B:
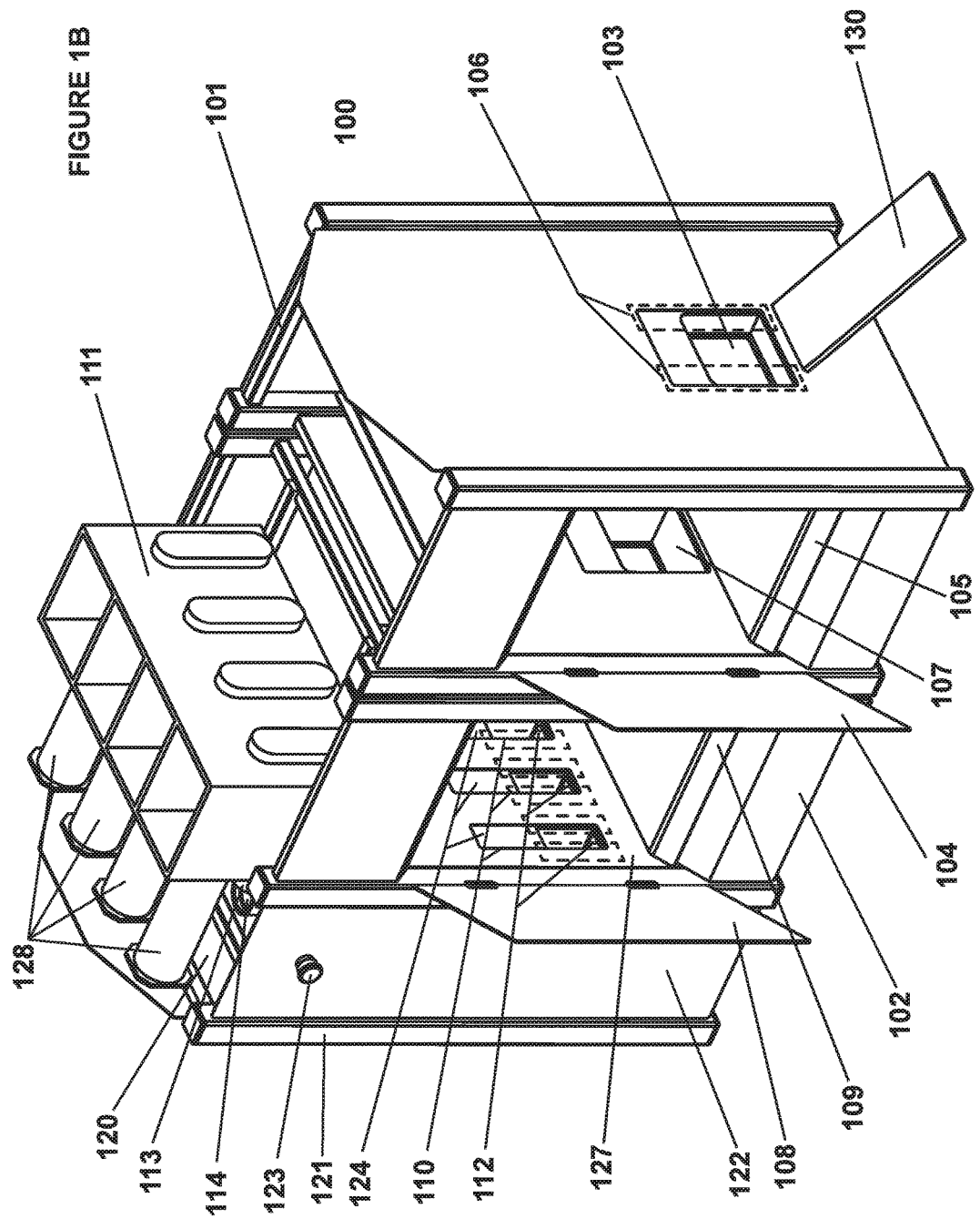
FIG. 1B is a perspective view depicting a complete feeding station with multiple feed delivery systems, in this particular embodiment there are four delivery systems.

A system and method for feeding animals is provided. Referring to FIGS. 1A through 10 enclosed herein, one embodiment of feeding station (100) can comprise of the following constituent parts:

1. A sorting stage or compartment (101), which can comprise an entry door (103), restrictor plate (106) ejection mechanism, at least one exit door (104), scale (105) and radio frequency identification (RFID) antenna (404) contained within it. Sorting compartment (101) can provide the ability to quickly and easily eject animals that do not qualify for a meal while another animal is eating.

2. A feeding stage or compartment (102), which can comprise an entry door (107), ejection mechanism, at least one exit door (108), scale (109), RFID antenna (404), a bird marking system and feed receptacle (110) with door (124) that can restrict access to feed receptacle (110). This is where an animal that qualifies for a meal will be located while it eats.

3. A feed delivery system consisting of storage bin or hopper (111), which can optionally comprise mixer (502) or agitator inside or affixed to the outside thereof, feed conveyance mechanism (113) such as a conveyer belt or an auger which can be of the rigid or flex style, feed pan (112) which can optionally be removable and/or connected to a scale (603), feed passageway or funnel (114) to connect conveyance mechanism (113) to feed pan (112), removable spilled feed collection tray and a mechanism to raise and lower the feeder. The feeder delivery system can ensure feed is available in feed pan (112) for those animals that qualify for a meal.

4. An electronics control panel (120), which can comprise one or more controllers (1000) with a plurality of analog and digital inputs and outputs, as well as communication network (1010) interface (1001) that can further comprise using a plurality of technologies such as Ethernet, Fiber, RS232/485, WiFi, USB, and any wireless communication technology which can include, but is not limited to Bluetooth or ZigBee wherein one or several motor controllers (1002), which can comprise of a plurality of levels of complexity ranging from simple H-Bridge relay banks to complex servo controllers, power supplies, RFID reader electronics (1003), equipment mounting hardware such as DIN rail, terminal blocks, other specialized electronic modules including, actuators, sensors, lighting controllers (1005) and connectors or cable glands, to connect to the various electronics, which can comprise sensors, motors, lights, and actuators (1004, 1006) situated around the feeding station (100) to the control panel (120). In some embodiments, control panel (120) can control all aspects of operation of the feeding station (100).

5. Frame (121) and covers (122) that can provide the ability to connect and support all of the constituent parts together and provide cover and guarding of the internal mechanisms which, if left unprotected, may cause injury to both birds and the technicians operating and maintaining the feeding stations. The guarding may also be designed to provide shielding to improve performance of an equipped RFID reader (1003) and antenna (404) systems.

Different embodiments may have different requirements, and some parts may be included or omitted depending on the exact functionality required for the particular application of the feeding station (100). Regardless of the various embodiments, the system can provide each animal with the right amount of food at the right time in an individual setting so that each and every animal will grow in accordance with best practices for that animal.

Entry Doors

Figure 2A:
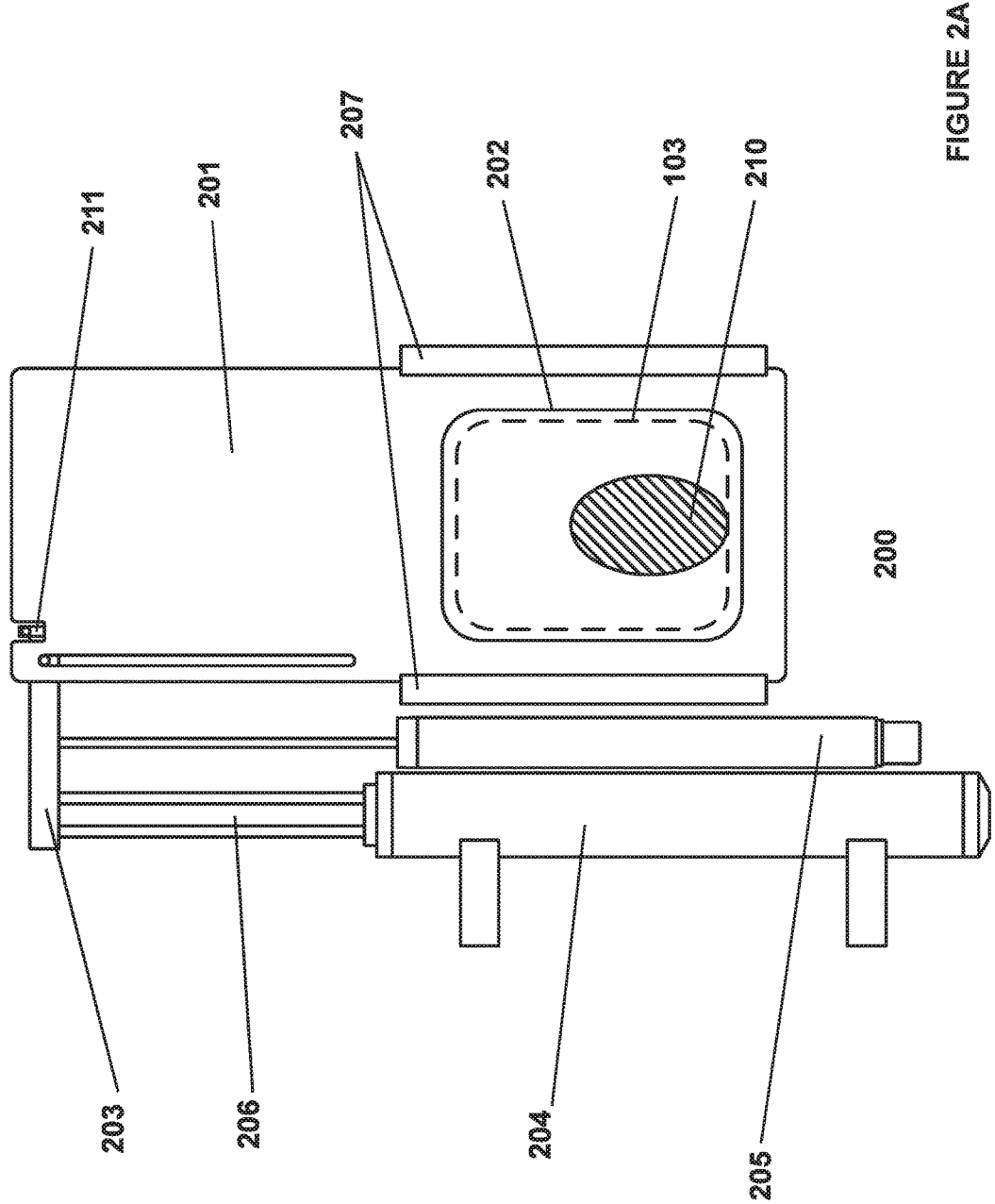
FIG. 2A is a front elevation view for a first embodiment of an entry door mechanism depicting an entry door mechanism using a linear actuator in the open position with an animal entering.

In some embodiments, entry doors (201) for both sorting compartment (101) and feeding compartment (102) can be configured in such a way as to limit entry to the station compartments to individual loose housed animals, and can comprise of a piece of plastic or light weight metal such as aluminum or thin stainless steel with opening (202) large enough for the type of bird or animal to be fed to pass through. In one embodiment, door (201) can be coupled (203) to drive mechanism (206), which can be driven via a linear actuator (204). In another embodiment, as shown in FIG. 2E door (201) can be coupled to motor (220) via leadscrew (221). In another embodiment, as shown in FIG. 2F door (201) can be coupled to motor (222) via a drive mechanism consisting of one or many pulleys or sprockets (224), axels (225) and belts or chains (223). All three of these embodiments will, when actuated, move door (201) in a vertical direction upwards to provide access into the compartment as shown in FIG. 2A, and downwards to prevent access to the compartment as shown in FIG. 2C. The door panel can ride inside guides or slots (207) to keep the door aligned and to limit motion to a vertical direction only. The motor (220, 222) or linear actuator (204) can be either direct drive, or have a gear box, and the actuator can be electric, pneumatic or hydraulic. Switches, encoders, proximity sensors, linear potentiometers (205), LVDT, and a multitude other different types of digital and analog feedback sensors and devices, can be used to detect the position of the door and both provide partial door opening ability and prevent over travel of the door.

Figure 2B:
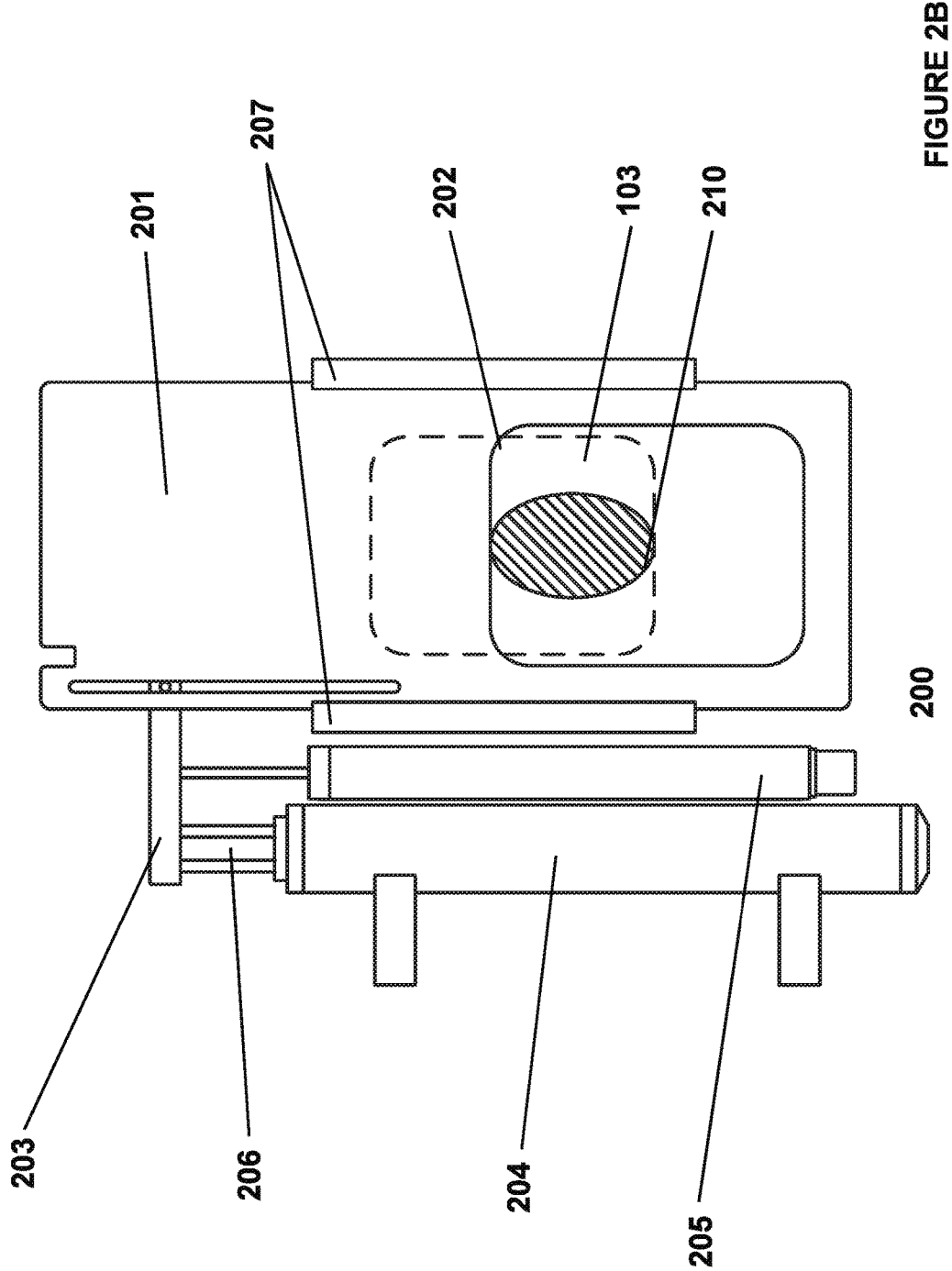
FIG. 2B is a front elevation view for a first embodiment of an entry door mechanism depicting an entry door mechanism using a linear actuator in the obstructed position.
Figure 2C:
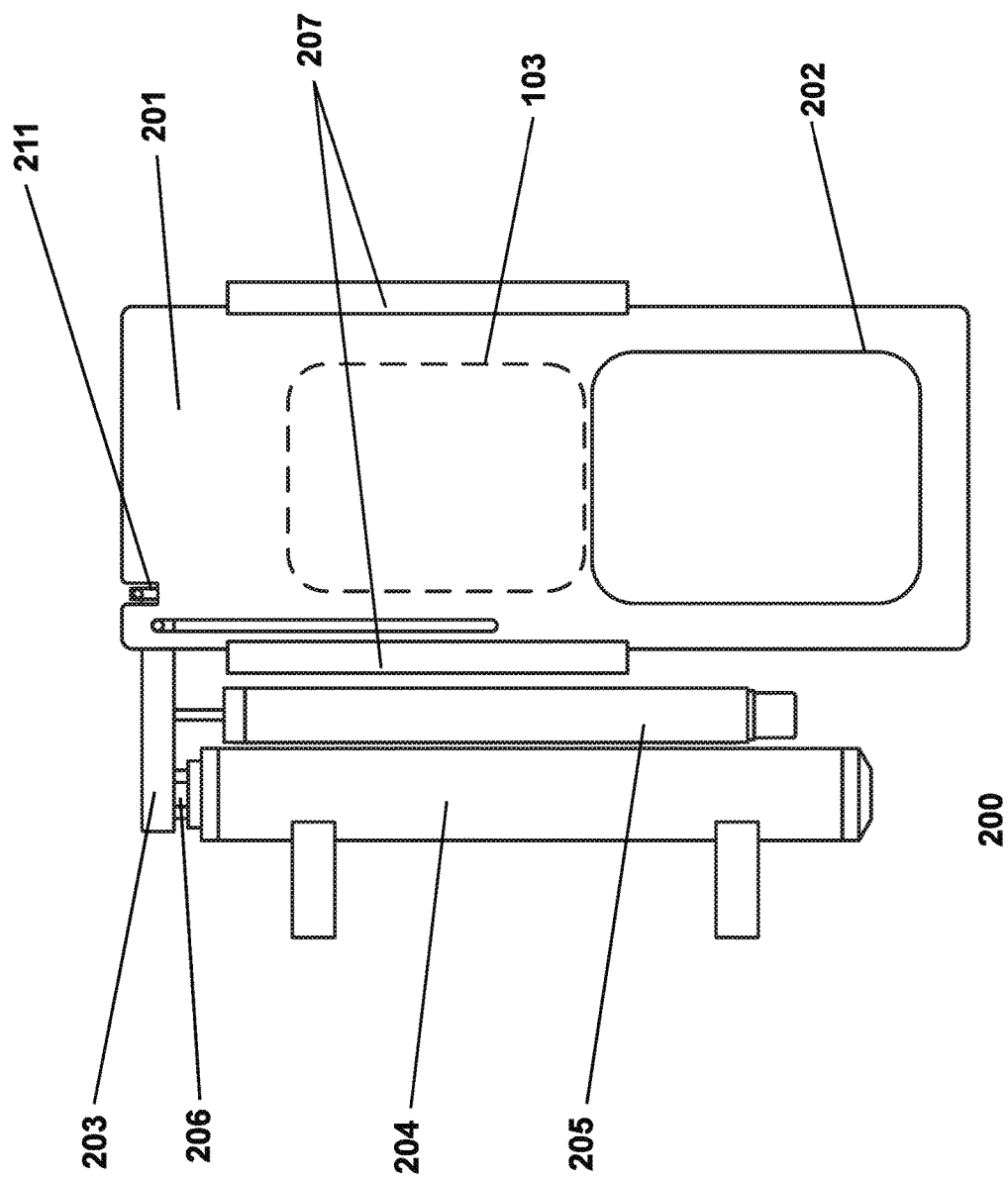
FIG. 2C is a front elevation view for a first embodiment of an entry door mechanism depicting an entry door mechanism using a linear actuator in the closed position.
Figure 2E:
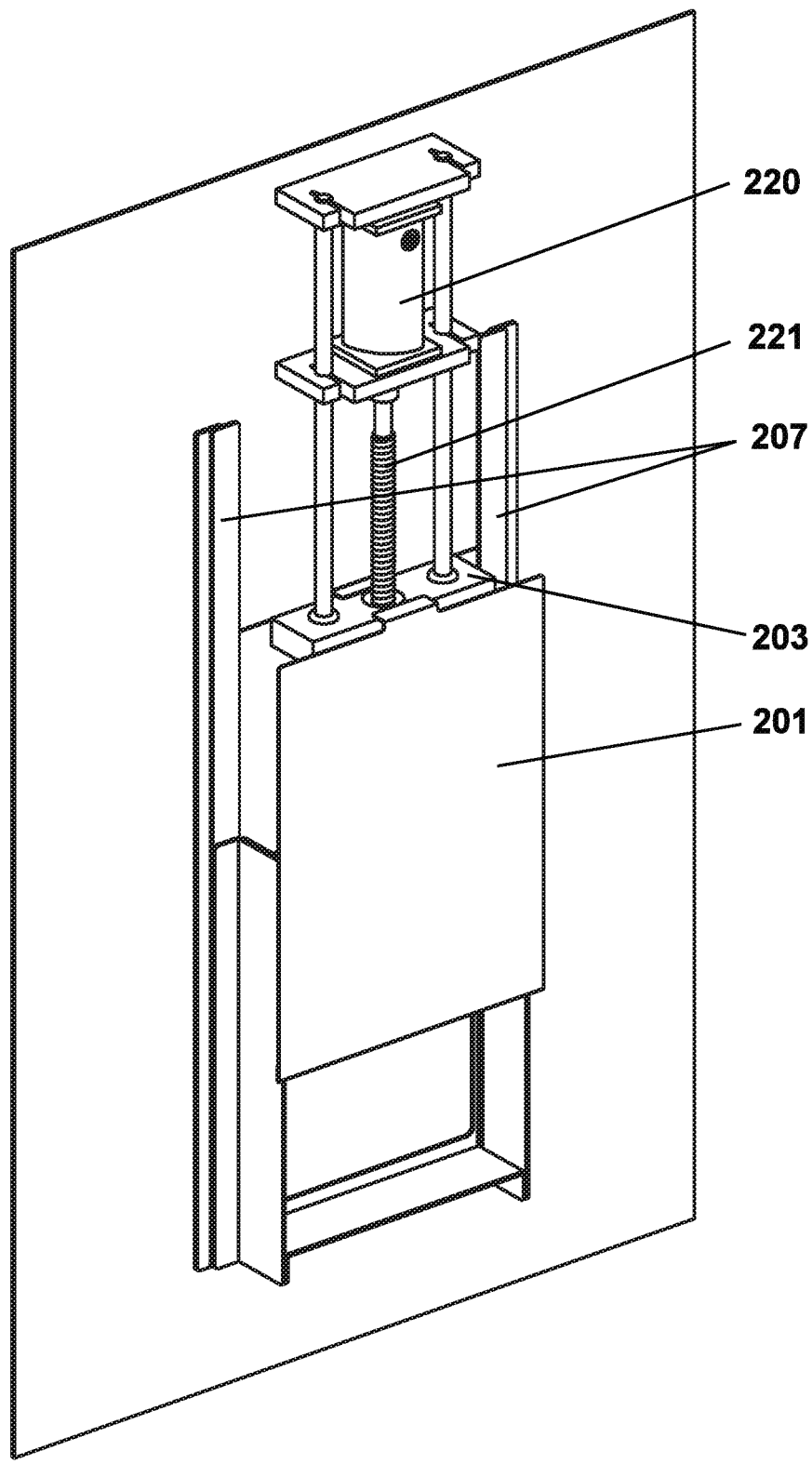
FIG. 2E is a perspective view depicting a second embodiment of an ejector mechanism utilizing a motor driven leadscrew coupled to the door panels.
Figure 2F:
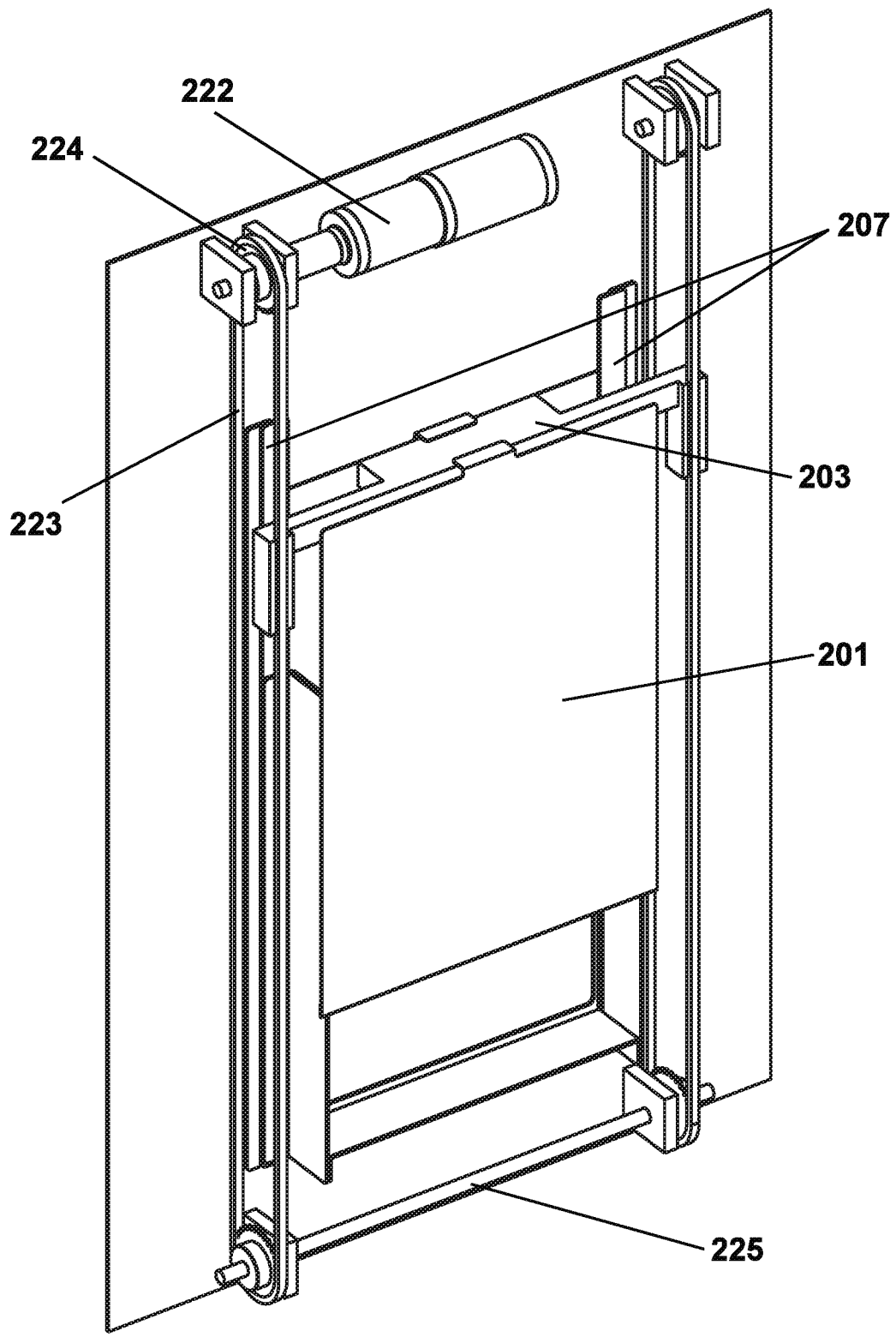
FIG. 2F is a perspective view depicting a third embodiment of an ejector mechanism utilizing a motor driven sprocket, chain, and axles drive mechanism which is then coupled to the door panels.
Figure 3A:
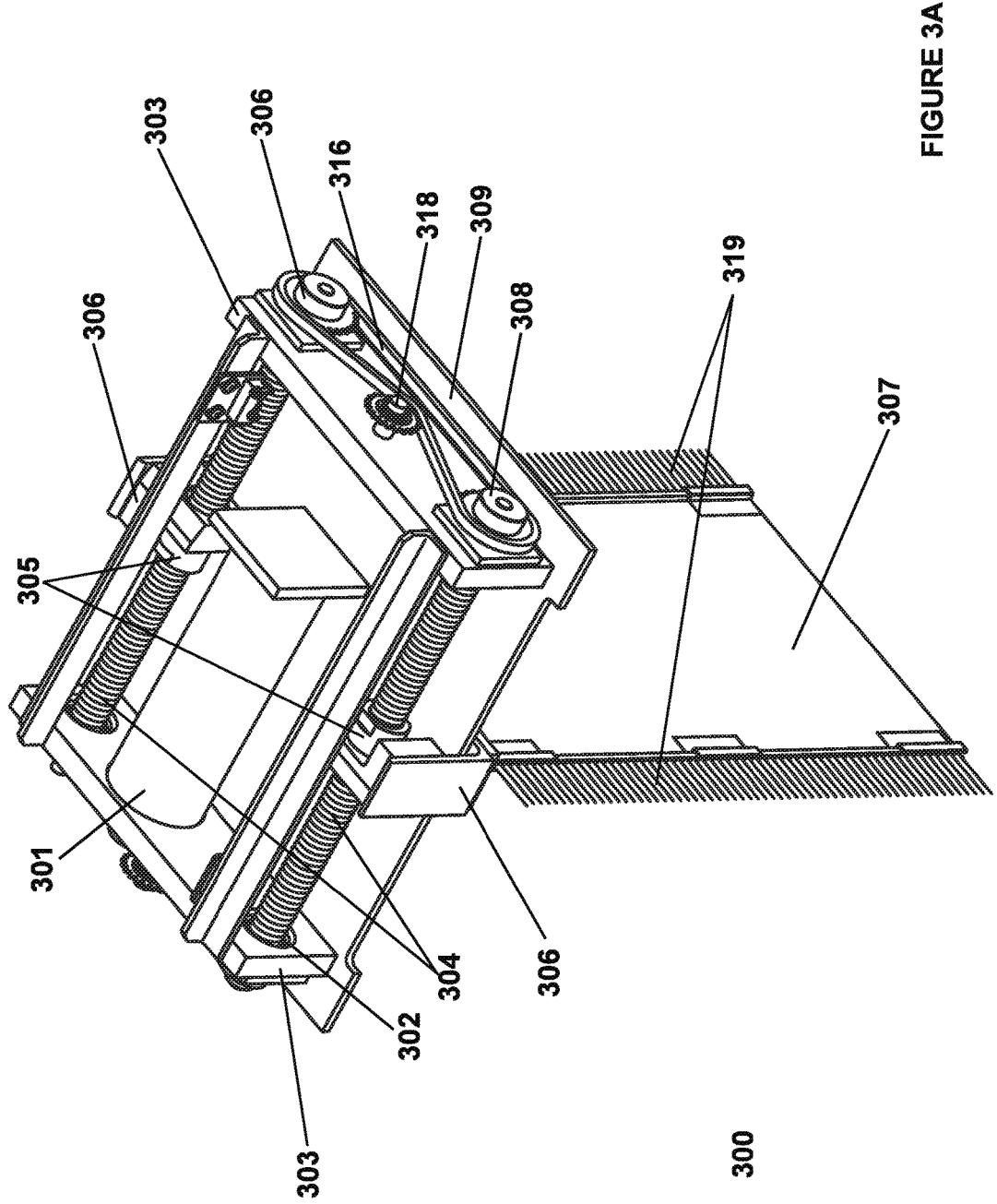
FIG. 3A is a top front view depicting a first embodiment of an ejector mechanism utilizing two leadscrews coupled to the ejector panel via bushings and a frame showing the linkage via a chain from the first leadscrew to the second leadscrew.
Figure 3B:
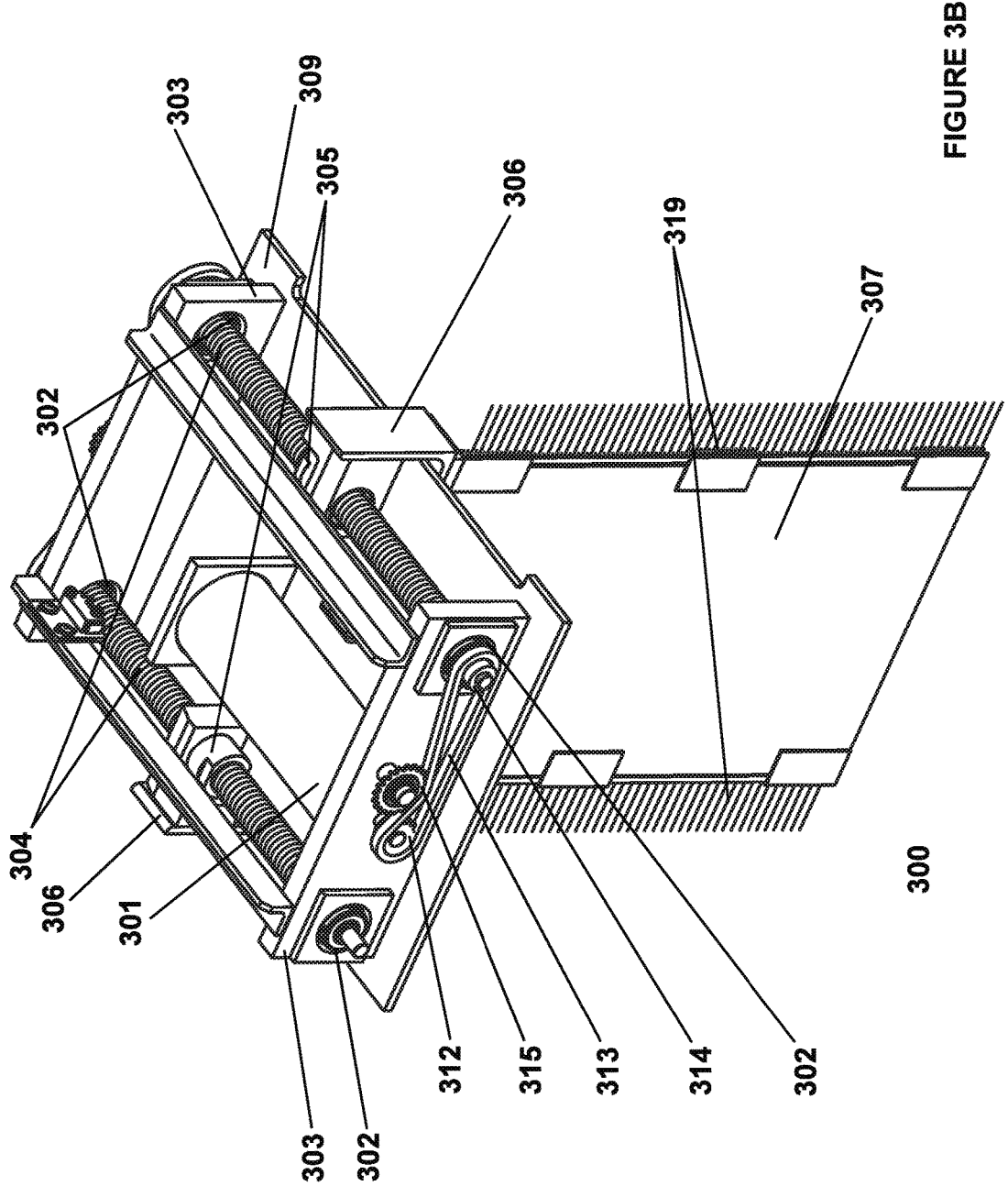
FIG. 3B is a top rear view depicting a first embodiment of an ejector mechanism utilizing two leadscrews coupled to the ejector panel via bushings and a frame showing the motor linkage via a chain to the first leadscrew.
Figure 3C:
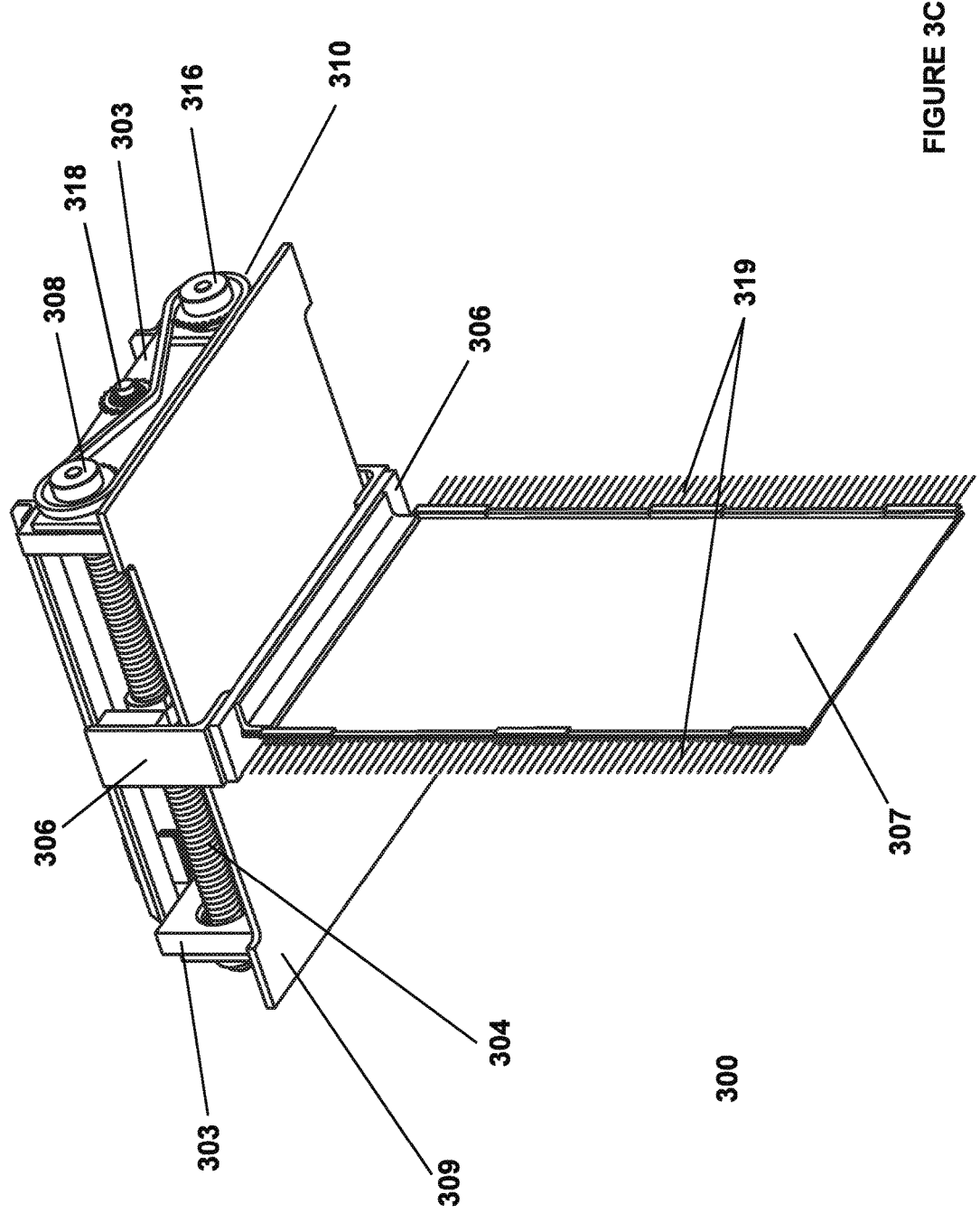
FIG. 3C is a bottom rear view depicting a first embodiment of an ejector mechanism utilizing two leadscrews coupled to the ejector panel via bushings and a frame showing the linkage via a chain from the first leadscrew to the second leadscrew.
Figure 3D:
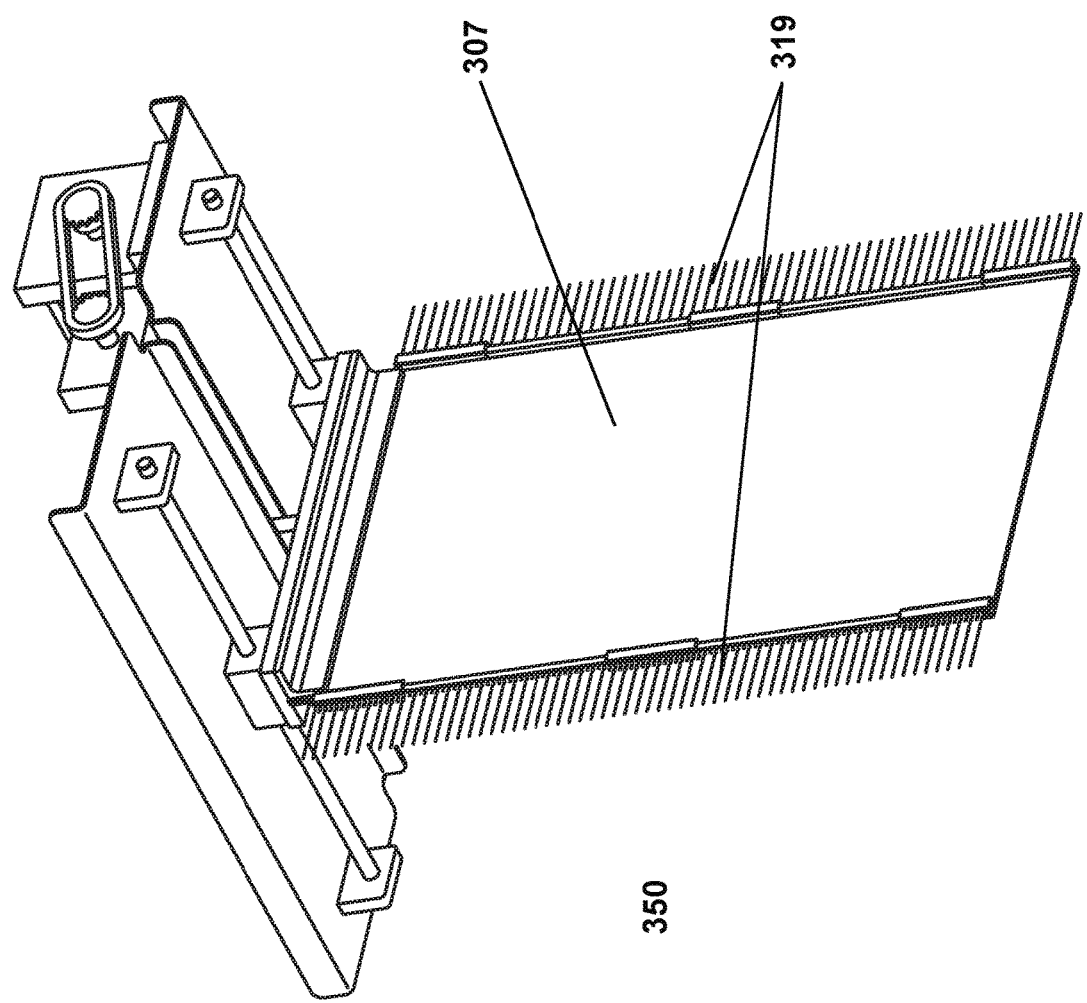
FIG. 3D is a bottom view depicting a second embodiment of an animal ejector mechanism using only a single leadscrew coupled to a motor via a chain drive and incorporating rails to prevent twisting of the ejector panel.
Figure 3E:
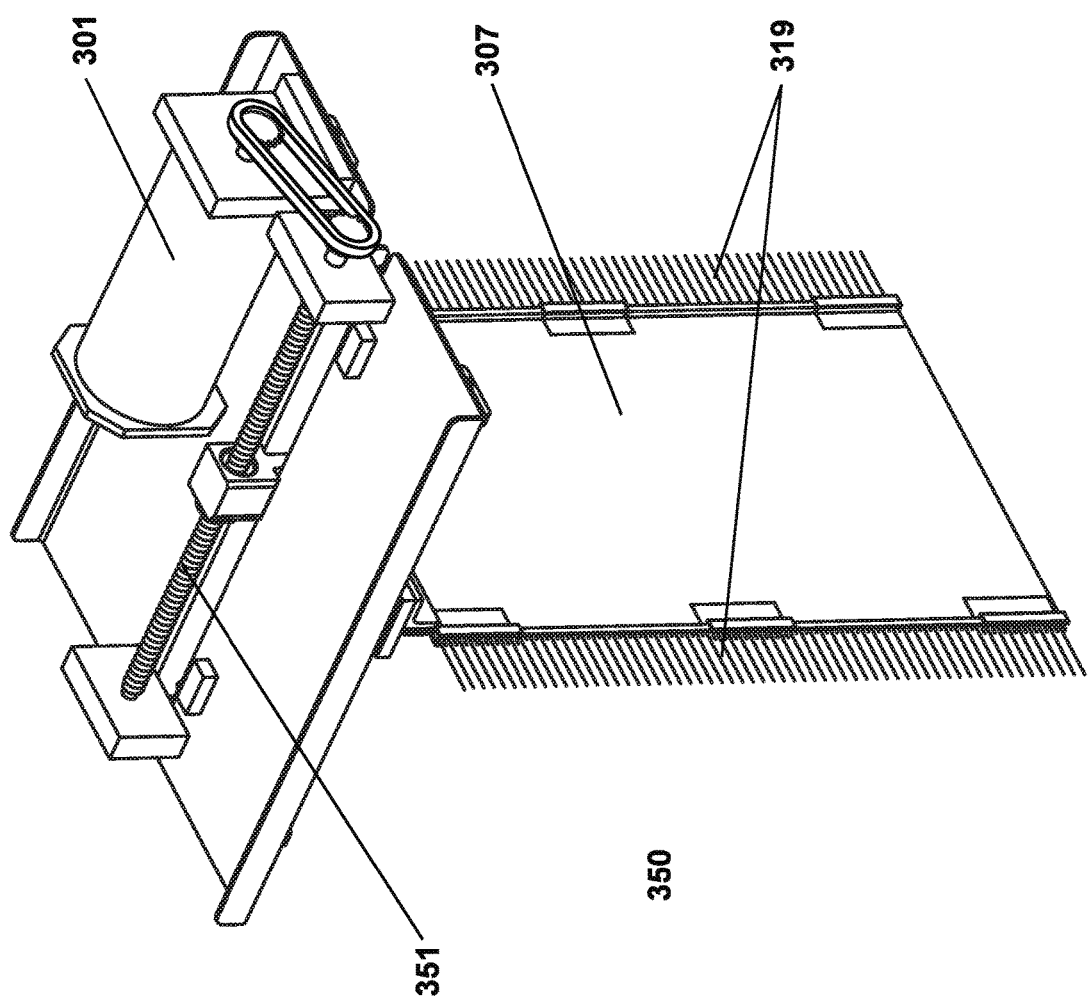
FIG. 3E is a top view depicting a second embodiment of an animal ejector mechanism using only a single leadscrew coupled to a motor via a chain drive and incorporating rails to prevent twisting of the ejector panel.

To prevent injury to the animal, in some embodiments, the coupling (203) between the door panel (201) and the drive mechanism (203) can be a loose coupling such that if door panel (201) becomes blocked as shown in FIG. 2B, no more than the weight of a single door panel (201) is driven down onto the animal (210). Door panel (201), coupling mechanism (203) or the door frame can have sensors (211, 212) that can allow for detection if the door way is blocked by either an animal or debris. In some embodiments, the door itself can comprise a pressure detection sensor on the bottom edge that can activate when it detects an object in the way. In other embodiments, the system can comprise switches (211) on coupling mechanism (203) that when door panel (201) stops moving, door panel (201) can lift from coupling mechanism (203), and switch (211) can then actuate and detect that door panel (201) is obstructed (210) as shown in FIG. 2B. In some embodiments, the system can comprise an optical sensor on one side of the door and an optical emitter on the other side of the door and when an object breaks the link between the emitter and the sensor, the bird is detected. To ensure the safety of the bird, some embodiments, as shown in FIG. 2D, can comprise more than one door panel (201) to prevent the animal from entering an area where it may get caught during ejection. In some embodiments, the system can comprise additional doors panels (201) in the middle to detect if an animal is trapped between the two sides.

To accommodate the animals from very young to full size, a full size door opening (202) may not be suitable for the early days of the animal's life. In such cases, restrictor plate or multiple restrictor plates (106) can be added to the outside front panel of sorting compartment (101) entry door (103) to limit the entry size, both in the vertical and horizontal direction. These can be changed from time to time as required as the animals grow towards maturity. It should also be noted that these restrictor plates (106) may only be required to limit size in the horizontal direction as entry door (200) can be adjustable to allow the opening height to be limited to anywhere between fully open (FIG. 2A) and fully closed (FIG. 2C) and, thus, limit the size of the vertical opening. Some embodiments can also comprise an RFID antenna around door opening (202) to provide a mechanism for individual bird identification.

Ejection Mechanism

In some embodiments, ejection mechanism (300, 350) can comprise an actuator coupled through a drive mechanism to a large panel (307) that moves from one side of sorting compartments (101) and feeding compartments (102) to the other side to gently but assertively push an animal out of station (100) in the case it does not qualify for feed, or it has reached the end of its feeding bout. The actuator can comprise of electrical linear actuator or motor (301), or a pneumatic or hydraulic cylinder. In the embodiment shown in FIG. 3A, motor (301) can be disposed in the center, which can be coupled via sprockets, two threaded rods (304) or screws riding on bearings (bearings (302) can be contained into mounting blocks (303) via retaining rings) disposed on each side of the unit to evenly distribute the load which are then both coupled through precision bronze nuts (305) on each to ejector panel coupling mechanism (306) that can be, in turn, connected to ejector panel (307). Motor (301) can drive sprocket (312) that can be connected to chain (313) that can also be connected to sprocket (314) affixed to one end of threaded rods (304). Between motor (301) and threaded rod (304) can be another sprocket (315) that can be used to properly tension chain (313). The other end of threaded rod (304) can comprise sprocket (308) also attached that can then be coupled via chain (310) to the other threaded rod (304) via sprocket (316) affixed to it. In some embodiments, there is another sprocket in the middle (318) that can be used to properly tension this chain (310). This double threaded rod (304) solution can provide the ability to drive ejector panel (307) from both sides for a balanced loading on the drive components. Base plate (309) and blocks (303) at both ends of threaded rods (304) can provide structural integrity, alignment and mounting locations for all of the parts to the whole mechanism, allowing for the entire ejector mechanism (300) to be easily removed and replaced as needed for servicing. When motor (301) rotates, both of threaded rods (304) can move precision bronze nuts (305) in the same direction, which in turn through ejector panel coupling (306), can move ejector panels (307) in the same horizontal direction.

In some embodiments, ejector panel (307) can comprise a small gap between the bottom of the panel and the scale platform (105, 109) to ensure that ejector panel (307) does not come in contact with and damage the scale (400) or cause excess weight to be applied to the scale (400). In some embodiments, ejector panels (307) can comprise a gap on the side to prevent the animal's head from being trapped and potentially causing serious injury. To prevent the bird from being able to squeeze between ejector panel (307) and the side wall of the station and potentially get a non-approved meal, the gap between ejector panel (307) and the side wall can be filled with a brush like material (319) that can prevent the bird from seeing the gap and also provide significant resistance. This prevents juvenile or small animals from squeezing through the space between ejector panel (307) and the side wall of the station compartments (101, 102). The ejector (300) can be configured to eject animals in only a single direction, or eject out either side of the sorting and feeding stations.

In some embodiments, the threaded rods can comprise ball screws and the precession drive nut can comprise bearing balls to transfer the load between the screw and the nut. Also, belts can be used instead of chains with no loss of function. It is also possible to build ejector mechanism (350) such that only a single threaded rod (351) is required, see FIG. 3E.

In some embodiments, the ejector may not actually make physical contact with the animal to be ejected and, instead, can make use of other stimuli to make the animal uncomfortable and leave on its own accord. Examples of this can include: a strong air blast using air knife technology to encourage the bird to leave; using sounds or images to startle the animals; small non-injuring electric shocks; or using 95 Ghz directed-energy beams to dielectrically heat the animals skin to cause discomfort and to encourage the animal to leave on its own accord. In some embodiments, the ejection mechanism (300, 350) can comprise an actuator raising one side of the weighing platform (105, 109 to cause the animal to slide out of the side of the compartment (101, 102).

Exit Doors

In some embodiments, exit doors (108, 104) which may be located on both sides of the station (100) for both the feeding compartment (102) and sorting compartments (101) and thus comprising a total of four exit doors (108, 104) can be configured such that they can be self-closing using either a spring mechanism or a gravity self-closing hinge to shut the exit door (104, 108). In addition, the exit doors (104, 108) can only open in a single direction to prevent birds from entering via exit doors (108, 104). Exit doors (108, 104) can also be configured to be light enough for even the smallest, youngest animals to easily open the doors and to ensure that there is little chance of an animal being trapped.

Body Weight Scales

Figure 4A:
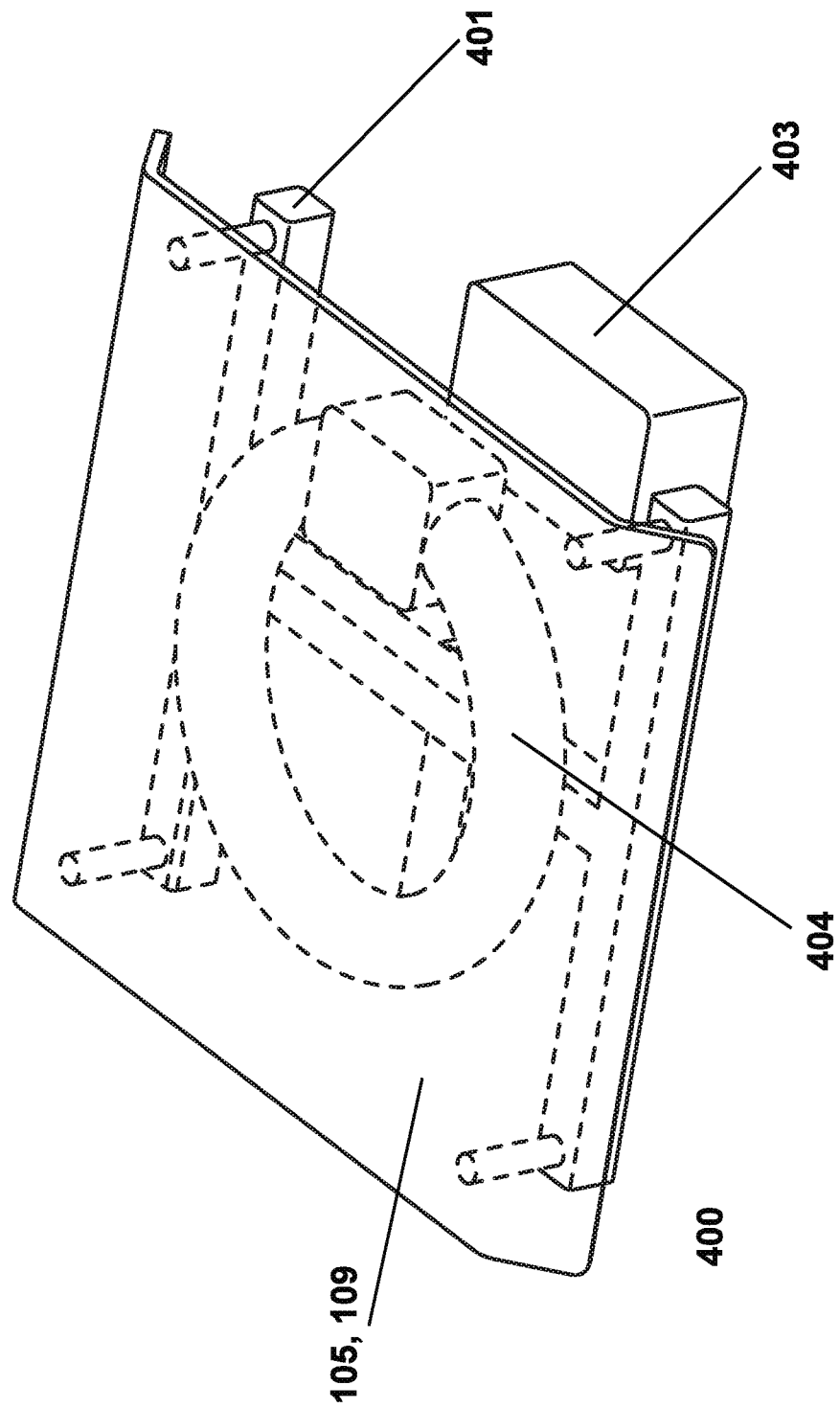
FIG. 4A is a perspective view depicting a scale platform with RFID antenna underneath.
Figure 4B:
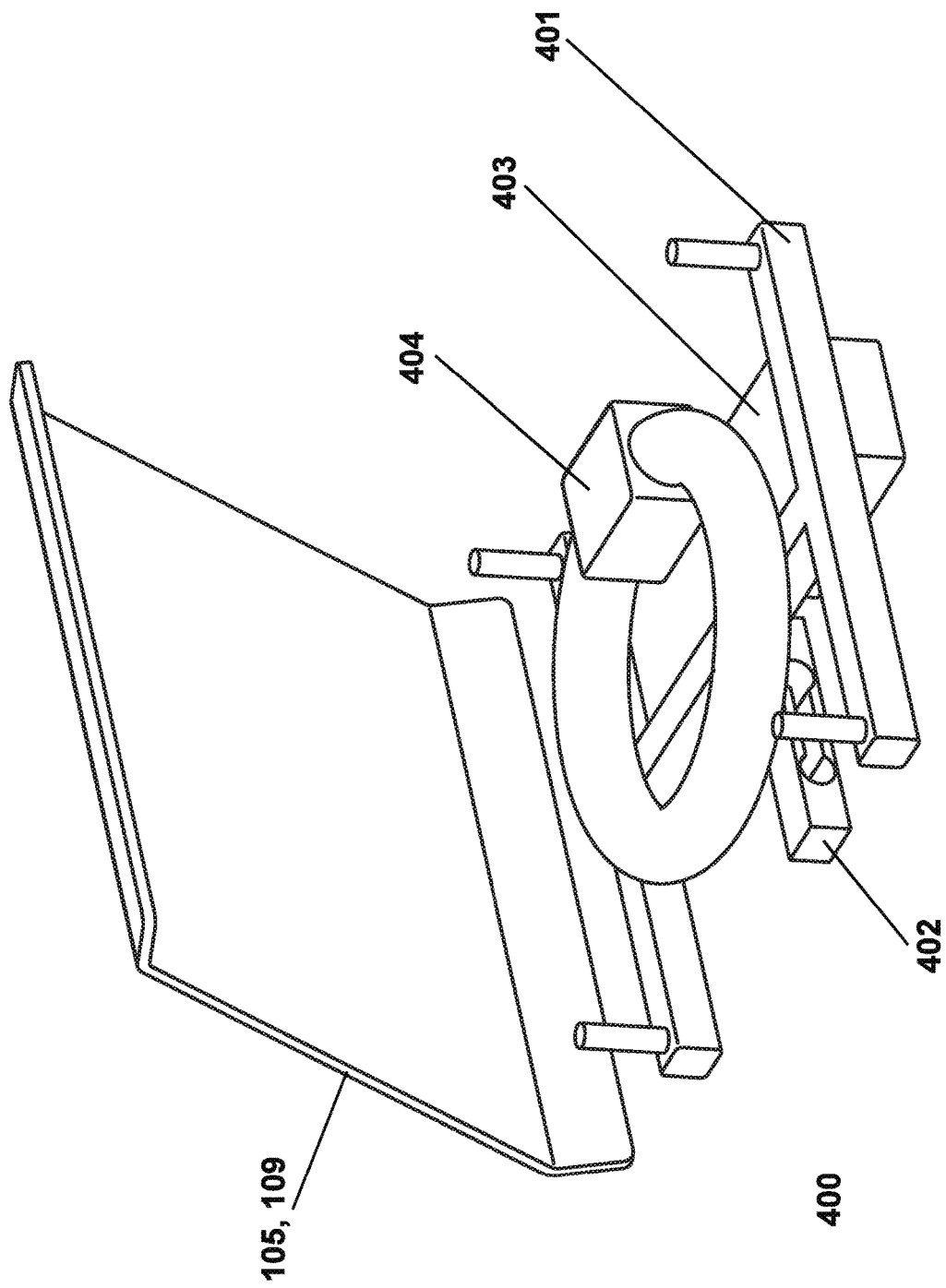
FIG. 4B is a perspective exploded view depicting a scale platform with RFID antenna.

In some embodiments, scale (400) (as shown in FIG. 4) can comprise of platform (105, 109) that can be rigidly affixed via mounting frame (401) to one or several weight sensors (402). In some embodiments, sensors (402) can comprise strain gauge or piezoresistive load cells but in other applications, other technologies such as electromagnetic force restoration sensors can be used. The edges of platform (105, 109) near exit doors (104, 108) can be slightly angled to limit the amount of space between the edge of scale (400) and the edge of ejector panels (307) and, thus, prevent any ledges for the animals to grab onto or get caught on as they are ejected from sorting compartment (101) and feeding compartment (102). In some embodiments, the system can comprise RFID antenna (404) disposed underneath of scale platform (105, 109) to provide a mechanism for individual bird identification. In order for this to work, a non-metallic platform material must be selected. Depending on the selection of the platform material, in particular, the texture and coefficient of friction, there may be a requirement to add an additional layer of traction material to the top of scale platform (105, 109) to allow the animals to comfortably use the system. In some embodiments, scale platform (105, 109) itself can be easily removable for cleaning and maintenance of sensor (402).

In some embodiments, the system can comprise analog conditioning in order to condition, filter, and amplify the measured scale values received from scale sensors (both feed (603) and body weight (402)) to get a signal with a good signal to noise ratio to be transferred to the controller (1000) and read in by the analog to digital converters. This analog conditioning can be done inside of control panel (120), or outside of control panel (120) in sensor conditioning box (403) depending on the induced signal noise due to the ambient electrical noise into the scale sensor (402) cable. The analog conditioning described can comprise one or more of low pass, high pass and band pass filtering via various passive and integrated circuits interconnected together as well as the use of operational amplifiers and instrumentation amplifiers to get the required level of signal gain. Some embodiments can comprise doing the analog to digital conversion right by the scale (400) in sensor conditioning box (403) and then communicating those digitized values to controller (1000) instead of including analog to digital converters inside controller (1000) module (1005). In some embodiments, controller (1000) can be configured to do signal processing on the scale sensor values to increase the accuracy of the measurements, and to attempt to remove animal motion artifacts. Such signal processing can include, but is not limited to, averaging, removal of outlier values, Fast Fourier transformation to do various filtering, and more complex analyses as well known to those skilled in the art.

Feeding System

Figure 5A:
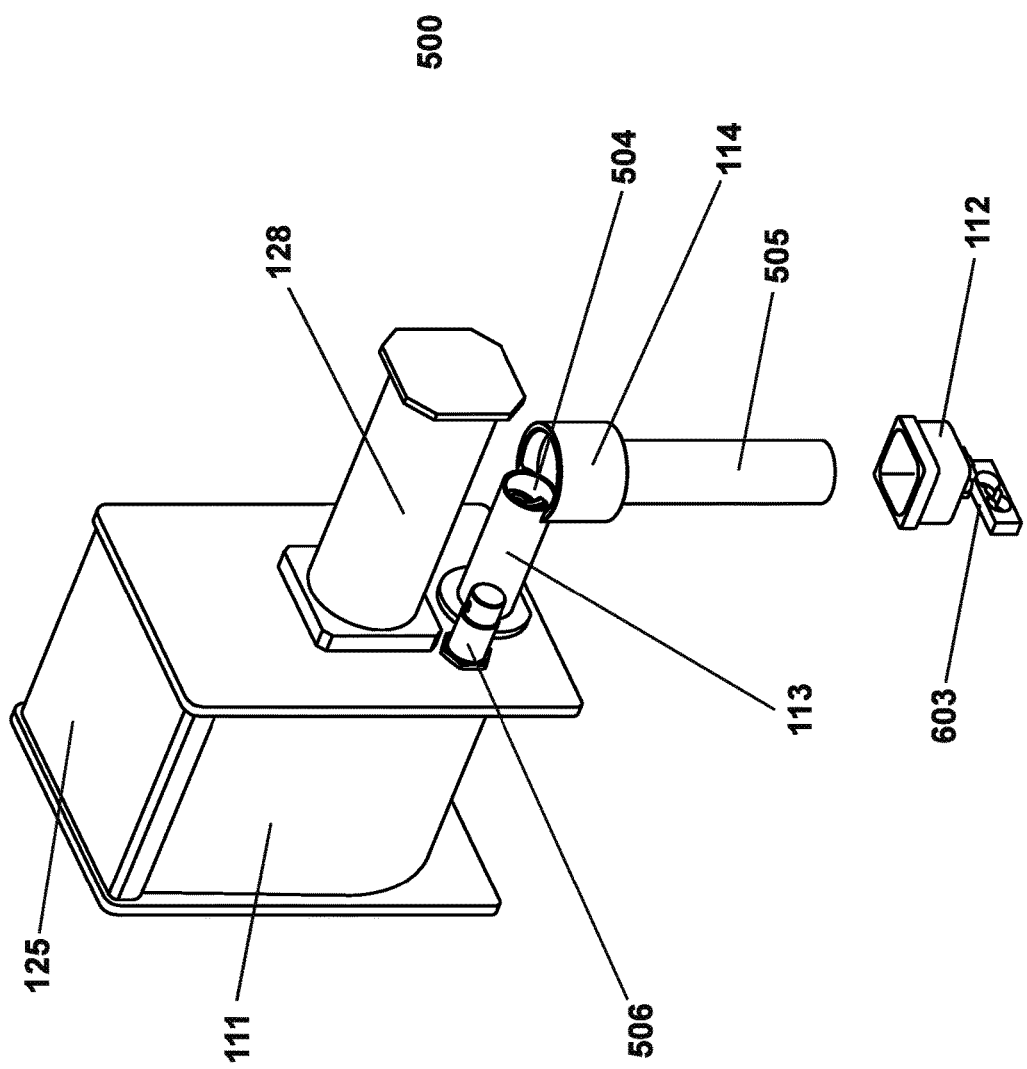
FIG. 5A is a perspective view depicting a feed storage and delivery mechanism with a single hopper.
Figure 6A:
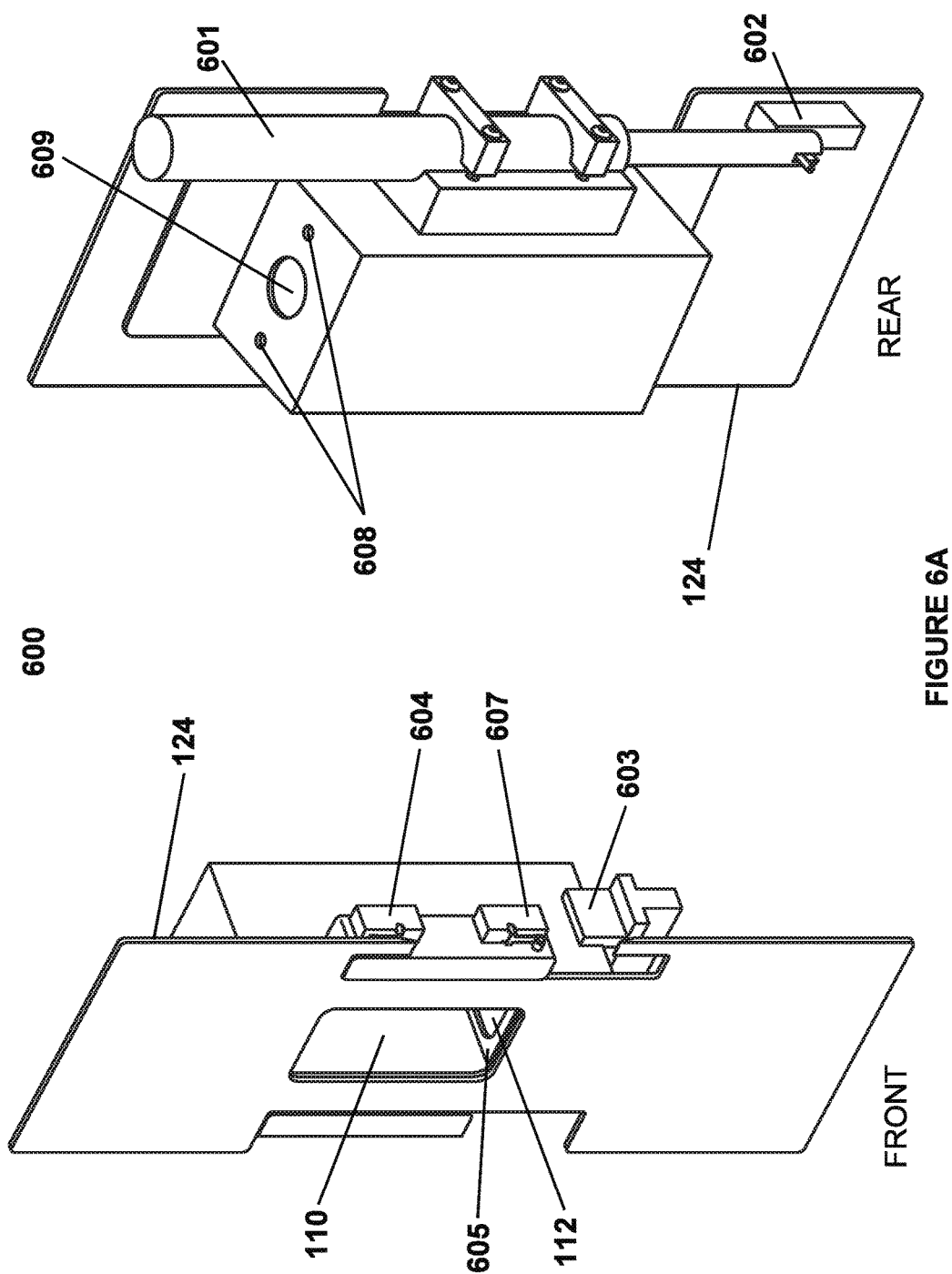
FIG. 6A is a front and rear view depicting a feeder mechanism with the feed door in the open position.
Figure 6B:
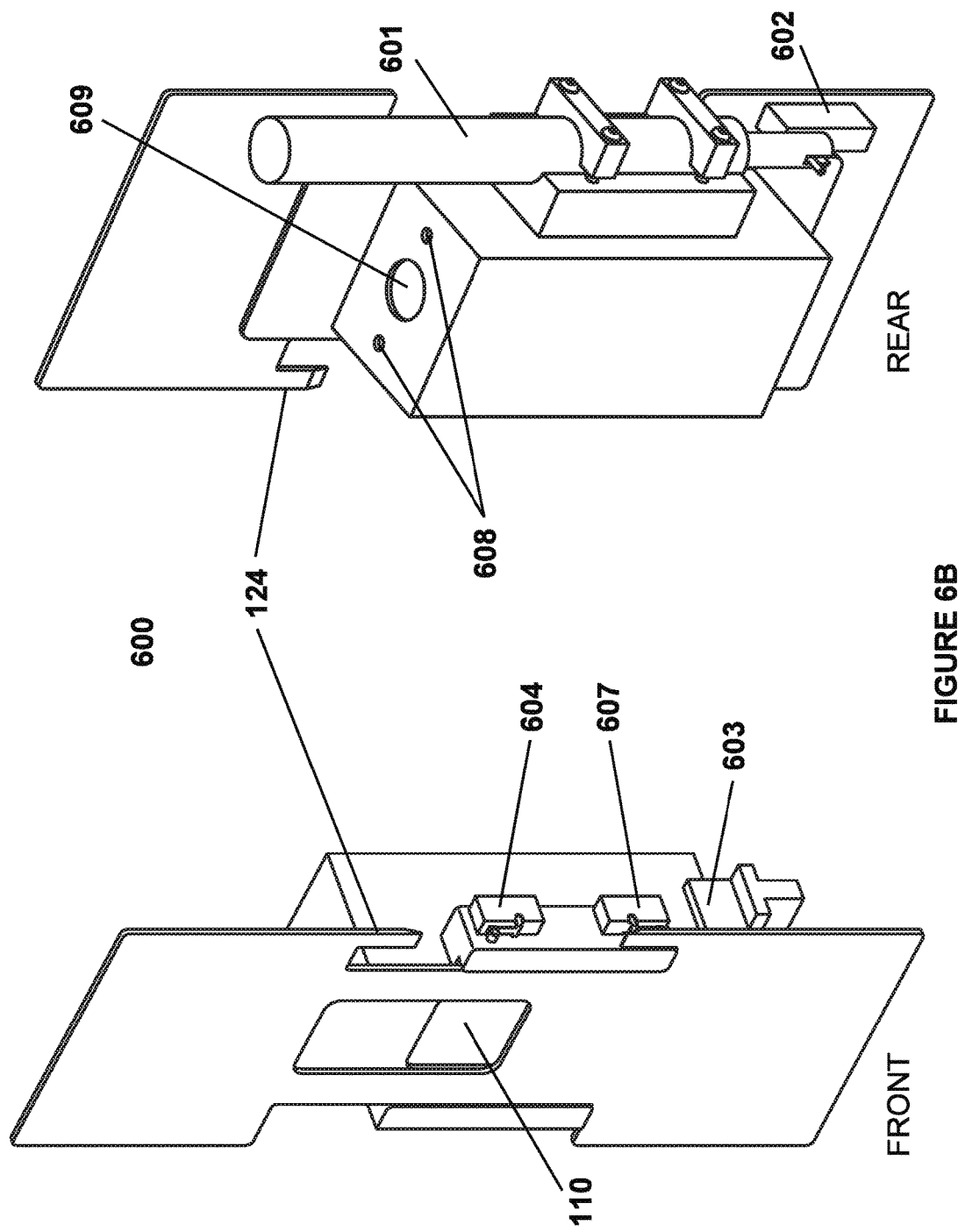
FIG. 6B is a front and rear view depicting a feeder mechanism with the feed door in the closed position.

In some embodiments, the feed system can comprise of two parts that can be independent from each other: the first part can comprise storage and delivery mechanism (500) shown in FIGS. 5A and 5B; and the second part can comprise feeder mechanism (600) shown in FIGS. 6A and 6B.

In some embodiments, the animal can feed through an opening on the side wall of the feeding compartment (102) as shown in FIG. 1A. Feeding compartment side wall (127) with feed receptacle (110) can have provisions for mounting feeder reducing plate (126), which can decrease the accessible opening size of feed receptacle (110) to prevent small birds from entering into feed pan (112). Feeder reducing plate (126) can comprise of only vertical opening limitations to prevent birds from being injured during feed door (124) movement by being pinched between feed door (124) edge and the top of feeder reducing plate (126) opening.

In some embodiments, feed door (124) mechanism can be attached to feed mechanism (600) as depicted in FIGS. 6A and 6B, or attached to the side panel of feeding compartment (102). Feed mechanism (600) can provide the ability to prevent access to feed pan (112) for the animal inside of feeding compartment (102); it can also have a secondary role of assisting with containing feed spillage during the refilling of feed pan (112). Feed door (124) mechanism can first comprise of a piece of plastic or light weight metal such as aluminum or thin stainless steel with a hole large enough for the type of bird or animal to be fed to pass its head through and access feed pan (112) that can act as the door. The door can be coupled (602) to actuator (601) that can further be electric, pneumatic or hydraulic. In some embodiments, the door can be coupled (602) to linear electric actuator (601) with an appropriate amount of stroke length to move the door from fully open, as shown in FIG. 6A, to fully closed, as shown in FIG. 6B. Other embodiments can comprise a drive mechanism that can further comprise a chain or belt driven system.

In some embodiments, feed door (124) mechanism can have no feedback available to controller (1000) of the position of door (124), and the door opening and closing can be based solely on having motor or actuator (601) run in the correct direction for a predetermined length of time. In some embodiments, switch (604) can confirm that the door is fully open, and/or another switch (607) to confirm the door is fully closed, wherein these switches (604, 607) can be actuated by cams, trip dogs or other features built into or attached to feed door (124) or features built into coupling mechanism (602) between the door (124) and actuator or motor (601) as well known to those skilled in the art. In some embodiments, a precise feedback mechanism, such as a linear potentiometer or a linear variable differential transformer (LVDT), can be attached to feed door (124), or to feed door to actuator coupler (602).

In some embodiments, feed pan (112) can be rigidly affixed to one or several weight sensors (603). In some embodiments, these sensors can comprise strain gauge or piezoresistive load cells (603) but in other applications, other technologies such as electromagnetic force restoration sensors can be used, as well known to those skilled in the art.

Feed Supply System

In order to manage feed delivery to feed pan (112), station (100) can be equipped with one or more feed storage hoppers (111). In some embodiments, feed hoppers (111) can be located above station (100). In some embodiments, feed hoppers (111) can be kept off station (100) and connected to station (100) through either a hard pipe or a hose with some mechanism to move feed from hopper (111) to top of feeder mechanism (600) through feed entry aperture (609) in small enough increments to meet the requirements of precision feeding.

In some embodiments, the system can comprise mixer (502) or agitator connected to feed hopper (111) to prevent feed clumping and bridging inside of hopper (111). This agitator can comprise a vibrational agitator affixed to the outside of the hopper (111) that can use vibration to loosen the feed inside of hopper (111). In some embodiments, the agitator can comprise paddle wheel (502) disposed inside of hopper (111), where paddle wheel (502) can be connected to motor (128) that can break up the feed when running. In some embodiments, paddle wheel (502) can be linked to its own motor, which can run at a predefined interval. In other embodiments, hopper paddle (502) can be linked to the same motor (128) that runs feed auger (113) so that mixing happens every time feed is dispensed.

In some embodiments, as shown in FIG. 1A, a single feed hopper (111) can be located above station (100). At the bottom of feed hopper (111), there can be a solid or flex type auger (113) capable of moving slow enough to move feed out through auger spout (504) and down through feed funnel (114) and into feed pipe (505) that can then fall into feed pan (112) in a controlled and metered pace. Feed pan (112) can comprise cone or skirt (605) therearound to prevent spillage of feed outside of feed pan (112). In addition, feed door (124) can be closed during the feed fill operation to ensure that no feed is spilled onto the top of bird scale platform (109) or into other parts of station (100). In some embodiments, removable spilled feed collection tray can be disposed underneath of feed pans (112) at the bottom of station (100) to collect any feed that may have gotten through the gaps around feed pans (112). In some embodiments, auger (113) can be pulsed to dispense only small amounts of feed each time through auger spout (504) and into feed funnel (114).

In some embodiments, as shown in FIG. 1B, a plurality of feed hoppers (111) can be disposed on top of station (100) with a corresponding number of feeder mechanisms (600) allowing birds access to a plurality of different feeds depending on their weight, body curve treatment, RFID or any other parameter as set by the station operator. In the case of multiple feed mechanisms (600), each mechanism (600) can be coupled to an associated hopper (111), and each hopper (111) can be of a different configuration and volume to allow a larger volume of feed to be available for those feeds that are used more often and smaller volumes of feed to be available for those rarely used feeds. In some embodiments, feeding compartment side wall (127) can comprise a number of openings (110) and feed door (124) systems corresponding to the number of hoppers (111) and feed mechanisms (600). Each feed door (124) and opening (110) can comprise the same capabilities as its single feed source equivalent.

In some embodiments, where feed intake measurement is not required, a single or plurality of hoppers (111) or drop tubes can supply feed to each feed pan (112), none of which must be suspended on a load cell (603). The feeders in this embodiment can be configured as a self-feeder that the animal inside station (100) will receive access to by actuating feed door (124) when the desired feeding conditions are met.

In some embodiments, entire feeder mechanism (600) can be lowered and raised as the age of the birds increases to provide the bird with proper access and overall a more comfortable eating experience. In some embodiments, feed mechanism (600) can be raised and lowered by hand, and then click into notches at several different spots along the way or perhaps further adjustability could be provided by using a bolt or wing nut to lock feed mechanism (600) at the height desired by the technician. In some embodiments, the system can have the mechanism to raise and lower the feeder further comprise a screw that is coupled to feed mechanism (600) and, thus, by turning the screw, feeding pans (112) can be raised or lowered. In some embodiments, the mechanism can have the screw coupled to a motor that is, in turn, controlled by the controller (1000) wherein the feeder mechanism (600) can be automatically raised and lowered depending on the age of the birds. In some embodiments, this automated feeder position system can have position feedback being provided to the controller (1000), which can be through various limit switches, or some kind of other analog or digital feedback system such as a linear potentiometer or a linear variable differential transformer (LVDT) as well known to those skilled in the art.

In some embodiments, hoppers (111) can comprise one or more feed level sensors (506) to indicate the current level of feed in hopper (111). These level sensors can be set by controller (1000) to trigger an alarm to the operator that a station (100) has either run out of, or is running out of, feed. In addition, level sensors (506) can be used to trigger a central feed distribution system to fill feed hopper (111) and then shut off the system when hopper (111) is full. In some embodiments, hoppers (111) can be connected to a facility's central feed distribution system to ensure that hopper (111) is always kept at the desired fill level. In some embodiments, controller (1000) can provide feedback to the operator through server (1020) of how often hoppers (111) are running empty, or the number of fills that are required from the central feed distribution system. The entire feeding system can support multiple different types of dry feed, which can include mash, crumbles, pellets, whole grains and powders among others.

Animal Marking System

During certain parts of the animal rearing cycle, in particular, the training phase, there is value in being able to mark the birds that have entered the feeding compartment (102) of the station (100). This will help the livestock technicians quickly identify unmarked birds that are not eating and need assistance with understanding how the system works and may be required for remedial training outside of the standard training protocol. The marking system can consist of a micro droplet dispenser attached to the feeder station entry door (107), or at the feed receptacle (110) which will attach a small amount of animal safe dye to the animal each time it enters the feeding compartment (102) or is by the feed receptacle (110). As time goes on, the colour on the birds will deepen if the birds have eaten, birds that are not eating or eat very rarely will not show any colour on their feathers. Another embodiment might have a more active and selecting marking system that can mark animals for any number of other reasons such as that it has reached its sale weight, or perhaps to identify the bird as potentially having an illness, or requiring any type of individual attention in a research or breeding setting.

Ancillary Sensors

In some embodiments, the system can comprise other sensors to measure various other aspects of the bird or environment, as well known to those skilled in the art. Environmental sensors can include sensors configured to detect temperature, humidity, light colour temperature, light intensity, and air quality (for example dust, $O_2$, $CO_2$, $H_2S$ and $NH_3$ levels). Examples of bird sensors can include infrared (IR) sensors configured to measure animal body temperature or accelerometers to measure nature of activity for the determination of the onset of illness or infection, as well as visual analysis systems configured to gauge animal structure and gait as well known to those skilled in the art.

In some embodiments, the system can comprise a water intake measurement device that can allow the animals to take in water, and that data can be attributed to the particular animal and stored in the supervisory control and data acquisition (SCADA) software system and database (1020, 1021). Some embodiments might also provide extra ventilation to increase the animals comfort and health in the form of a fan, heater, or cooling apparatus in either or both of the feeding compartment (102) and sorting compartment (101). This ventilation can either be controlled by its own standalone controller or be controlled by the station (100) controller (1000) and other ancillary sensors.

Control Panel (120)

Figure 10:
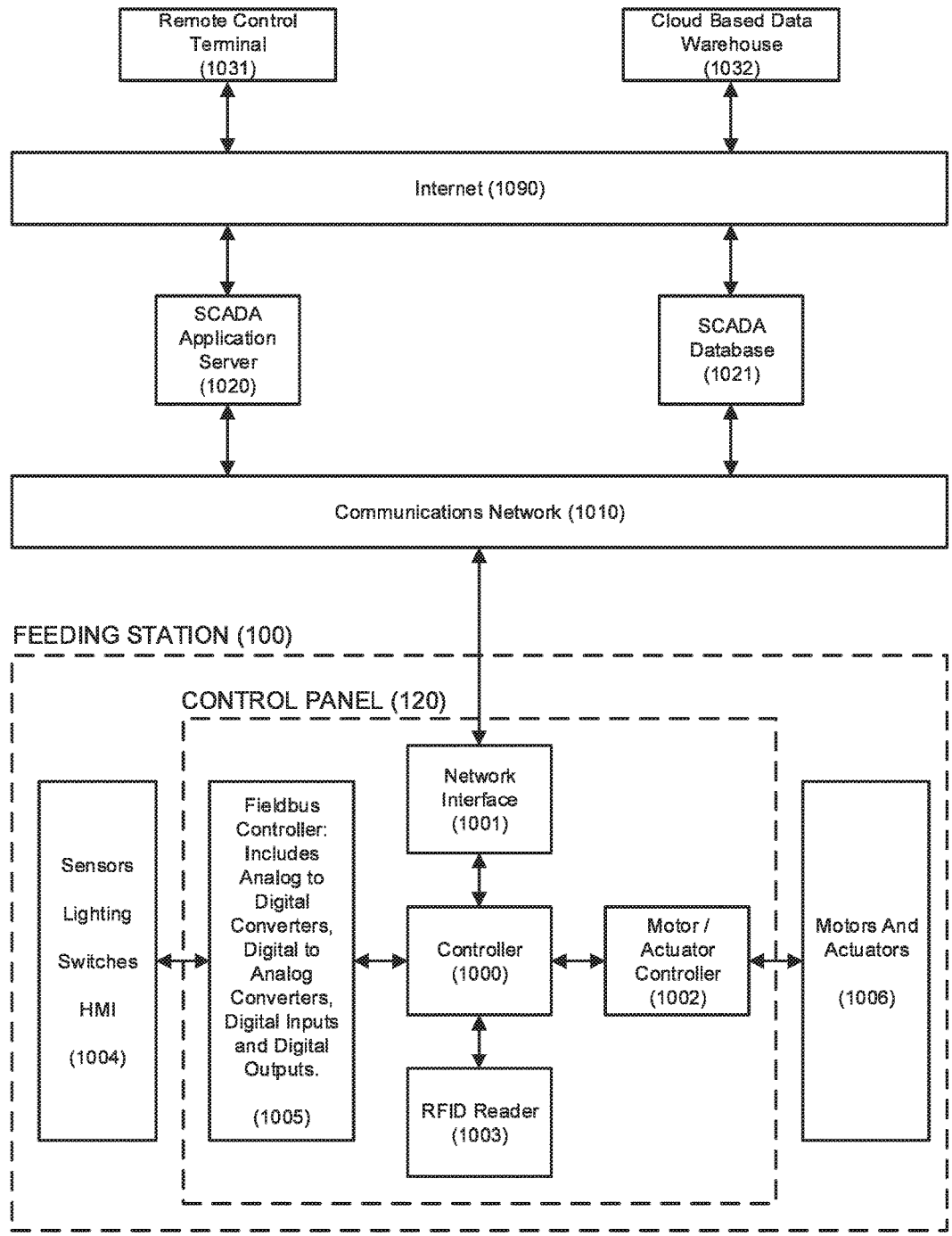
FIG. 10 is a block diagram depicting one embodiment of the electronics, data storage method, and flow of data, in the system.

In some embodiments, control panel (120) can comprise control and power supply electronics required to run the system, as shown in FIG. 10. Control panel (120) can comprise a mechanism for connection to a central mains power distribution system and battery or generator back-up for fail safe shutdown or continued operation. This connection can be through some kind of pluggable supply cord, or hard connected through some kind of conduit or Teck cable type connection. The incoming supply connection can be a plurality of different combinations of voltage and frequency, therefore, it is important for all internal circuitry to be configured to work seamlessly for a plurality of locations and jurisdictions. In some embodiments, the incoming power can first pass through some kind of current limiting device, such as a fuse or circuit breaker, and then a surge protector to protect the supply wiring and internal circuitry from over current and over voltage conditions. In some embodiment, all controllers, motors, actuators, and sensors can use and/or operate using a single control voltage of 24 VDC, that can require the use of an AC to DC power supply to provide a suitable amount of 24 VDC power to the system.

Because of the high dust and debris environment prevalent in most livestock facilities, all control panels can be sealed to a NEMA® 4× rating. In some embodiments, all electrical connections to the sensors, switches, lights, motors, and actuators (1004, 1006) from the control panel (120) can, where possible, be configured to allow for easy disconnection using connectors sealed to at least IP65 and, where possible, to IP67 sealed connectors to allow for quick repair of damaged or defective components. In cases where connectors are not possible, then wires can be passed through cable glands that can allow for at least IP65 and, where possible, IP67 sealing around the cable.

Control System

In some embodiments, all aspects of station (100) operation and communication with the supervisory control and data acquisition (SCADA) system and servers (1020) can be controlled by controller (1000), as shown in FIG. 10. Controller (1000) can comprise of an electronic device consisting of one or several integrated circuits (IC) such as, but not limited to, a central processing unit (CPU) or a microcontroller unit (MCU), short term memory such as dynamic random access memory (DRAM) or static random access memory (SRAM), storage which can include FLASH, EEPROM or a hard drive, a printed circuit board (PCB), one or more network interfaces (1001) often implemented in integrated circuits such as but not limited to I2C, SPI, UART/RS232, USB, Bluetooth®, WiFi, Fiber Optic, or Ethernet, analog to digital converters, opto-couplers, digital to analog converters, and associated voltage regulators. These components can be operatively coupled together on a custom designed circuit, and several functions can be included together on a single chip or, alternatively, a commercially available solution such as programmable logic controller (PLC), field bus controller, or a single board computer that can also be used to implement the functionality of the controller, as well known to those skilled in the art. Controller (1000) can also comprise interfaces, motors and actuator controllers (1002) to control the various motors and actuators (1006) in the system, RFID readers (1003), and analog and digital input output systems controllers (1005) to read sensor and switch states and control lighting, indicator lights and human machine interface components such as keyboards and liquid crystal displays (LCD) (1004).

The implementation of motor/actuator controller (1002) to provide control of various motors and actuators ranges from a simple H-Bridge relay control through the use of one single-pole single-throw (SPST) relay, and a dual-pole dual-throw (DPDT) relay of direct current (DC) servo motors and linear actuators in which only the direction and on/off are important. In some embodiments, solid state relays or motor controller application specific integrated circuits (ASIC) can be used to implement this same functionality. Specific applications may require more complex configurations such as advanced servo motor control using encoder feedback and profiled acceleration ramp up and ramp down of the servo speed. These can be accomplished through using much more complex commercially available servo driver motor controllers (1002), as well known to those skilled in the art.

In order to prevent injury to the bird, station (100) can comprise one or more protective covers (122, 125) to prevent the bird from accessing feed from the hopper (111) or falling into the hopper (111) and getting injured as a result. These covers (122, 125) can also prevent the birds from roosting on top of station (100), and potentially getting caught in other mechanisms inside of the station (100).

For the safety of the technicians using and maintaining the stations, each station (100) can be equipped with multiple emergency stop switches (123) that can prevent motor actuation while in emergency stop. Some of these emergency stop switches (123) can be triggered by the removal of covers or guarding such as the removal of feed hopper lid (125).

In some embodiments, controller (1000) can contain firmware that can implement the application code required to implement the functionality necessary to operate the feeding station. Controller (1000) can be field updated to provide enhanced functionality and correction of programming defects. In some embodiments, controller (1000) can run an operating system (OS) such as Linux, Windows Embedded®, or Open BSD®, a real time OS such as QNX Neutrino®, or VxWorks® with the control code running on top of those operating systems in the form of an application or as a PLC application. Alternatively, the control application can be custom designed from the bottom up to incorporate both the operating system functionality and the controller functionality together into a single application as well known to those skilled in the art.

In some embodiments, controller (1000) can host a web page that can be used to view and change feeding station's (100) current configuration, view the error and activity log, help with diagnosing electromechanical issues, change the machine run state, upload and refresh body weight curves (701, 702) and set the associated animal age for example hatch date, add or modify bird identification tags and information, and set various communication parameters as required.

In some embodiments, the controller (1000) can communicate with a central SCADA system (1020) that can provide the controller (1000) with the information it needs to be able to process bird feeding decisions and store the activity, exception information and bird feeding data (body weights and feed intake) into a database. In some embodiments, SCADA server (1020) and database server (1021) can be comprised in the same computer or on different computers. It is also possible for data servers (1021) to be on different networks in separate locations, or be located in a cloud based data centre (1032) or data warehouse such as Microsoft® Azure®, or Amazon Web Services® where they can be used as a central data warehouse for potentially a very large number of SCADA servers (1020) each of which are connected to a very large number of feeding stations (100) through the Internet (1090). In some embodiments, the data can be stored in a relational database management system such as Oracle or MS-SQL for future use by technicians and researchers. Datasets can be queried from the larger database and used with programs such as Matlab, SPSS, SAS, or custom applications to do statistical analysis and provide visual or other feedback of a plurality of individual traits and aspects about their birds behavior and bird growth patterns which can be used to improve the productivity of current and future flocks or other individual or groups of animals. The SCADA application can comprise a Microsoft® Windows® application, a web application or some combination of the two, and the various SCADA server (1020) and database servers (1021) can be configured for remote access and management either through a remote desktop type of application, web portal, or through some other proprietary interface from a Remote Control Terminal (1031).

In some embodiments, communication between the SCADA system (1020) and the controller (1000) can be through communications network (1010), and can be implemented through any number of different technologies and protocols depending on the implementation of controller (1000) and SCADA system (1020). In embodiments where controller (1000) comprises a standard commercial PLC, then MODBUS®, MODBUS® TCP/IP, EthernetIP® or PROFIBUS can be used. In embodiments when a custom controller (1000) is developed, then an Ethernet connection and a standard TCP or UDP socket connection using a protocol like HTTP and encoding the data as XML and potentially encrypting the traffic using SSL or TLS can be used for communication. In some embodiments, several Ethernet devices can be connected together inside of control panel (120) using an Ethernet switch. In some embodiments, the device can be in a secure environment and, as such, a network security appliance such as a router with integrated firewall may be required to act as a gateway between local area network (1001) inside of control panel (120) to larger wide area network (1010).

Operation

Figure 8:
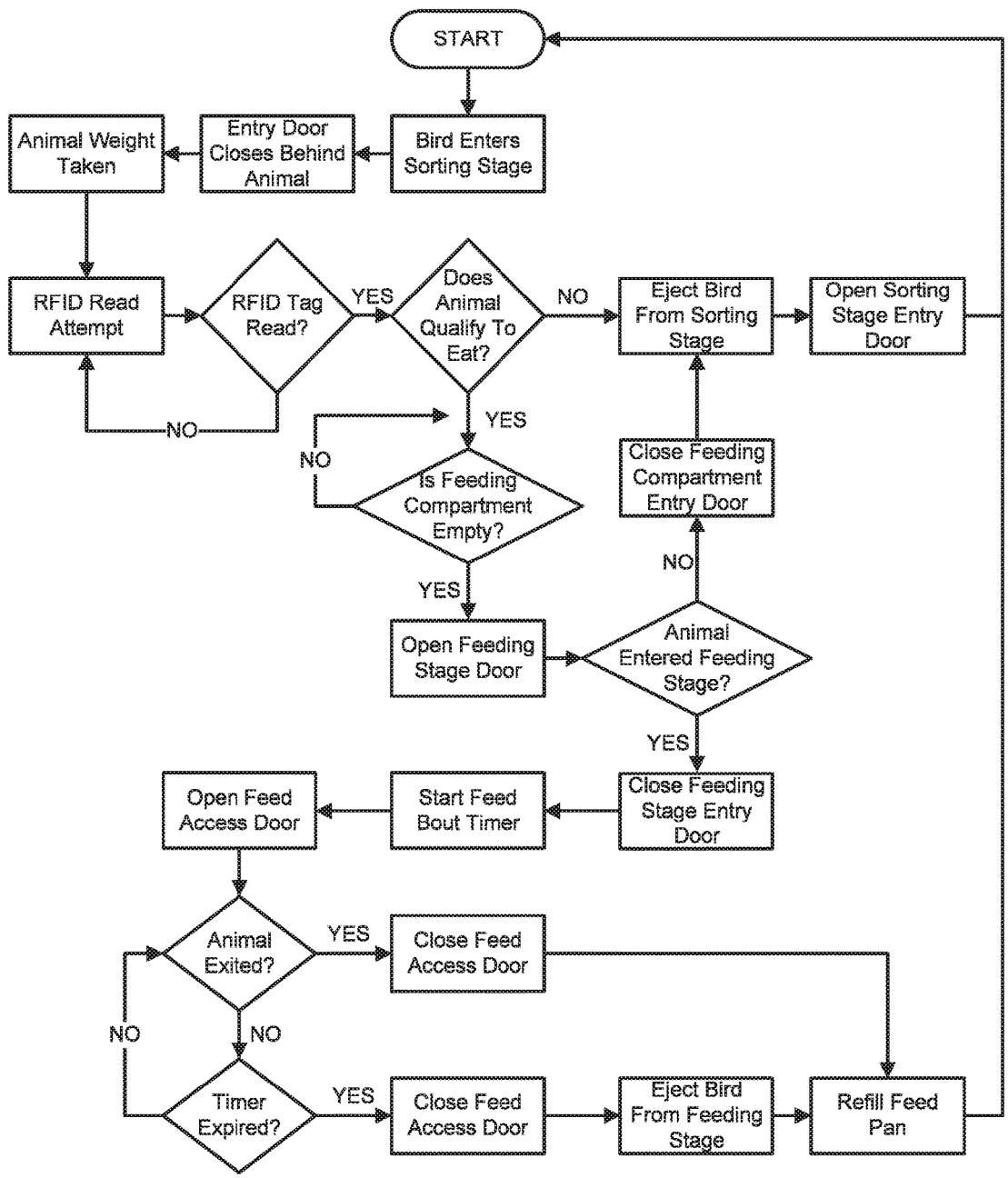
FIG. 8 is a flowchart depicting a feeding process of an animal passing through the feeding station.
Figure 9:
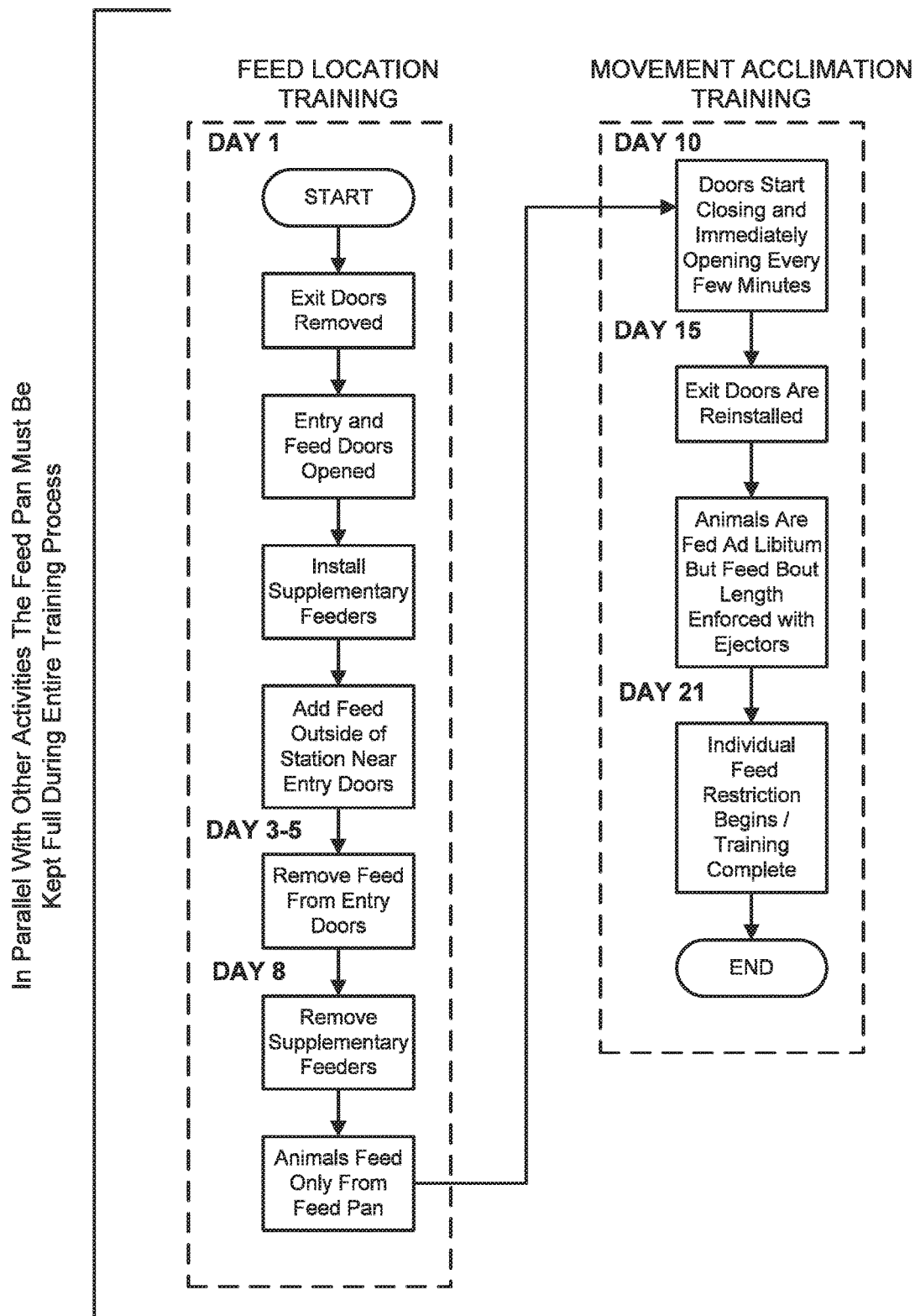
FIG. 9 is a flowchart depicting a potential training sequence to wean animals onto the station as their sole source of food.

Referring to FIGS. 8 to 10, FIG. 8 depicts a high level sequence of events for feeding a single bird. In practice, each step can comprise many sub steps, and many steps can be done in different order and additional steps may be required based on the individual requirements of the animal and application. The bird can enter precision feeding station (100) through entry door (103) of sorting compartment (101). As the bird shifts its weight from the outside of station (100) onto scale platform (105), controller (1000) can detect the bird's presence and can start to close entry door (103) of sorting compartment (101). In some embodiments, other occupancy type sensors can be used to determine if a bird or multiple birds have entered sorting compartment (101). These sensors can include an infrared or visual camera, a short range RADAR or LIDAR system, or one of many other motion detection sensors and technologies as well known to those skilled in the art.

For both entry door (103) at sorting compartment (101) and entry door (107) to feeding compartment (102), if door (201) strikes bird (210) as it is closing, door blocked switches (211) can depress and controller (1000) can stop the downward motion of door (201). Depending on the settings in controller (1000), controller (1000) can either wait until door blocked switches (211) become open again and then resume motion or immediately reverse the direction of door (201) either back to fully open or to a short distance wait for a short period of time for the bird to move forward and attempt to close the door (201) again. If after a configurable number of attempts controller (1000) is still unable to close the door (201), which can be caused by debris, mechanism failure, or the bird refusing to move, then controller (1000) will inform server (1020) of an error condition. In some embodiments, station (100) can automatically reset after several minutes and attempt to close door (201) again, this is to prevent prolonged downtime due to error conditions.

Figure 7:
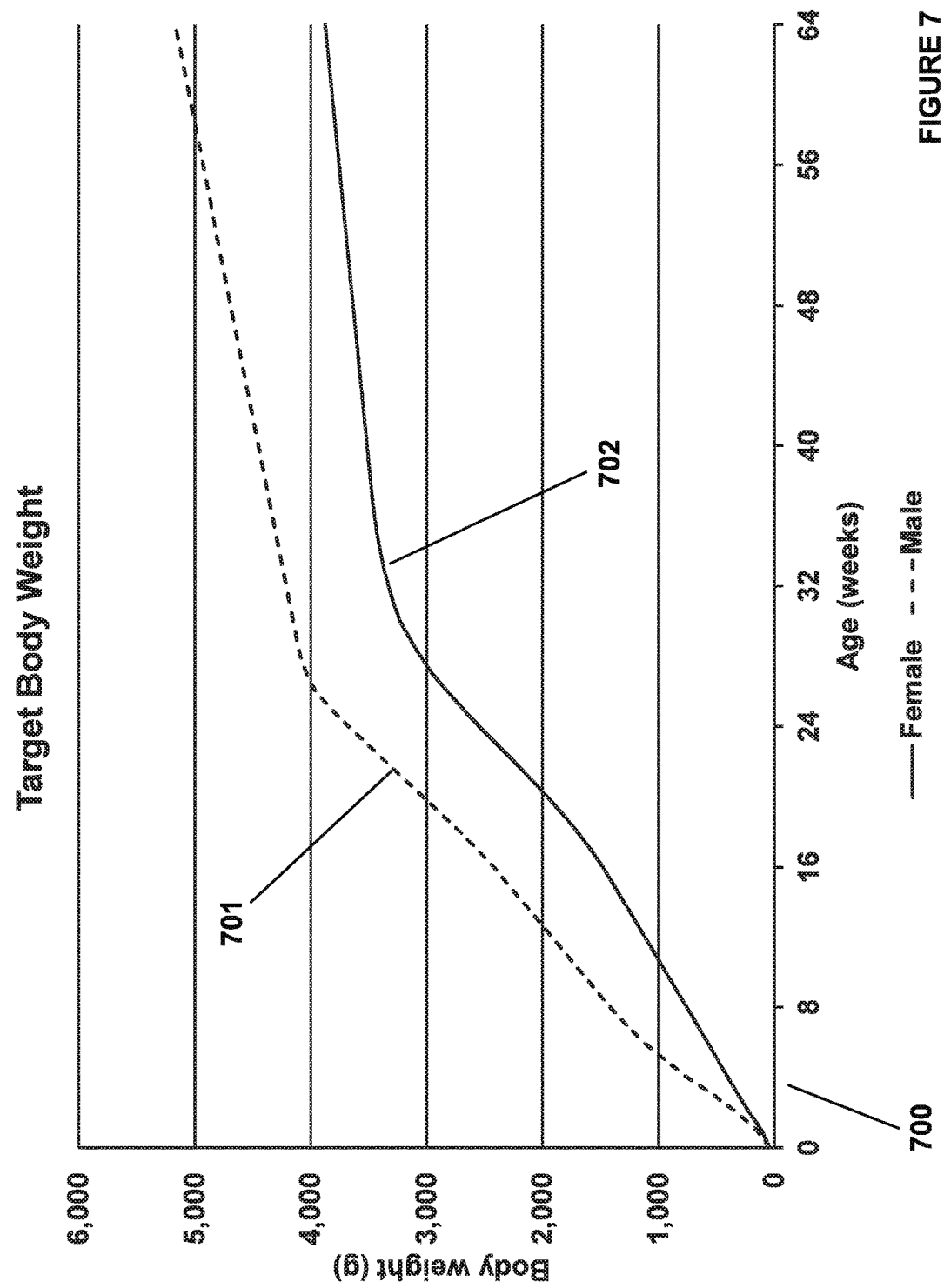
FIG. 7 is an X-Y chart depicting an example of body weight curves for female and male chickens.

With the bird fully onto scale platform (105) of sorting compartment (101), controller (1000) can take a weight measurement of the bird. If controller (1000) detects that there are two birds on scale platform (105), controller (1000) can eject the birds by moving ejector panel (307) from one side of station (100) to the other thus forcing the birds out of station (100) through exit doors (104). For cases in which the body weight curves (701, 702) (an example of which are shown in FIG. 7) are hard coded into controller (1000), controller (1000) can look up on body weight curve (701, 702) based on the animal's age since hatch or birth what the currently expected body weight for the bird is. There are often two or more curves as there can be a different body weight curves for males (701) and for females (702). In the case where the body weights are stored on server (1020, 1021), server (1020, 1021) can update periodically the current target bird body weight from body weight curve data (700). The body weight curve data (700) stored on controller (1000) or on server (1020) can be a table of target weights and age, or may be a mathematical formula.

In some embodiments, the system can have a highest possible current target weight for the bird regularly updated in the controller, which can be used to determine when there are more than one bird in the station or to determine if the bird is overweight wherein both are conditions on which the birds can be ejected from sorting compartment (101). If the bird weight is below the highest target body weight for the bird at the bird's current age, station (100) can take an RFID tag reading using RFID reader (1003) and RFID antenna (404). In some embodiments, RFID reader (1003) can take RFID readings until a tag is successfully read. In other embodiments, controller (1000) may require several successive matching successful RFID tag reads before being able to identify the bird based on the bird RFID tag. If after a configurable number of attempts to read a RFID tag are made and no successful tag is read, controller (1000) can inform the server (1020) that the bird in station (100) was unable to be identified (this can be through interference or lost tags) and then controller (1000) can eject the bird from the station using ejector mechanism (300). In some embodiments, where individual data collection is not required, animals can be fed according to target body weight or other criteria alone, without taking an RFID reading.

In some embodiments, a station (100) can have body weight curve data (700) permanently encoded into the on board controller (1000) and that using a simple interface, as an example, an onboard human machine interface (1004) such as a touch screen LCD, or a wireless or wired connection to a laptop, smartphone, or tablet, the station (100) can be configured so that it can run as an independent unit which does not require any communication with a server (1020). In some embodiments, station (100) can be initially set up with the hatch date of the birds, the current date, and the sex of the birds to be fed at which point the station has all of the information necessary to feed the birds to the desired body weight curve (701, 702).

For cases in which body weight curve data (700) is hard coded into controller (1000), controller (1000) can then look up on the body weight curve data (700) based on the bird's age since hatch what the currently expected body weight for the bird is. In the case where the body weights are stored on server (1020), server (1020) can update periodically the currently expected bird body weight. If the bird's weight is above or equal to the target body weight on the curve at the birds particular age, then the bird will be ejected from station (100). If the bird's weight is below the body weight curve for the sex of the bird (701, 702), then the bird will be permitted access to feed. Some embodiments may have a plurality of different target body weight curves in the same group of animals, and every animal can potentially have its own target body weight curve data. Animals can be moved from one target body weight curve to another at any time during its lifetime.

Body weight curves (701, 702) can be defined with bird value increments made on an hourly, daily, weekly, or any other temporal basis depending on the operators desired granularity and uniformity requirements.

In some embodiments, where the system does not make use of RFID tags, the bird's weight will be used to determine which body weight curve (male (701) or female (702)) the bird is on and then a feed decision can be made either in controller (1000) or in server (1020). As the birds grow past the chick stage, controller (1000) or server (1020) can raise both male and female birds together without the need for RFID tags by evaluating each bird's entry weight against both body growth curves (male (701) and female (702)) and selecting the sex and therefore the target body weight based on which curve the birds weight is closest to. Generally, the male body weight curve (701) will be heavier than the female body weight curve (702), and it is this fact that can be used to differentiate the bird's sex and ensure the proper body target weight is used to make the feed decision.

If ad libitum feeding is implemented, every bird will be given access to feed, and as this data has value in most scenarios the feed and body weights, and RFID tag number, of the birds can be stored in the server (1020, 1021) to monitor bird growth and feed intake. In embodiments where no RFID tag is required, the data can still be stored in the server (1020, 1021) without identifying individual birds.

With the bird feeding decision now made, wherein server (1020) and/or controller (1000) has determined that the identified bird has a body weight below the target value, controller (1000) can hold the bird in sorting compartment (101) until feeding compartment (102) becomes available as the previous bird leaves station (100). Immediately upon feeding compartment (102) becoming available, entry door (107) of feeding compartment (102) can open and the bird will be given an operator selected period of time to move from sorting compartment (101) to feeding compartment (102). If the bird does not move from sorting compartment (101) to feeding compartment (102) within the operator selected period of time, entry doors (107) of feeding compartment (102) can close and the bird can be ejected from station (100). In order to prevent the animal from being trapped in station (100), the bird can be free to leave out of sorting compartment (101) or feeding compartment (102) exit doors (108, 104) at any time.

As the bird shifts its weight from scale platform (105) of sorting compartment (101) onto scale platform (109) of main feeding compartment (102), controller (1000) can detect the bird's presence and can close main entry door (103). If door (201) strikes bird (210) when closing, the door blocked switches (211) can depress and controller (1000) can stop the downward motion of door (201) and, depending on the settings in controller (1000), either wait until door blocked switches (211) become open again and then resume motion or to reverse the direction of door (201) either back to fully open or to a short distance and then wait for a short period of time for the bird to move forward and attempt to close door (201) again.

Once the bird has successfully moved to feeding compartment (102) and feeding compartment door (107) has fully closed, entry door (103) of sorting compartment (101) can open and the system will wait for the next bird to enter sorting compartment (101).

After the bird either leaves feeding compartment (102) on its own as detected by the bird weight no longer being on main scale platform (105), or if the bird was forced out of feeding compartment (102) through forced ejection after the predetermined and configurable feeding bout length, controller (1000) can fill feed pan (112) back up to the desired level as selected by the user and wait for the next feeding bout to begin.

To prevent injury to the bird, station (100) can comprise feed door (124) that can be actuated to block the bird from the feed at the end of a feeding bout. Feed door (124) also can be used to prevent feed from spilling out onto feeding scale platform (109) during filling of feed pan (112). For when the bird is very young, a feed aperture reducer (126) can be added to the feed receptacle (110) to prevent birds from jumping into feed pan (112). Feed pan (112) can be directly coupled to a scale mechanism (603) such as, but not limited to, a 500 g strain gauge load cell to provide feedback to the controller (1000) of how much feed is in the feed pan (112).

To allow for birds to be able to eat all day and night, and to assist the birds with finding their way through the system, station (100) can comprise one or more lights, these lights can be in a plurality of locations including but not limited to the feed mechanism LEDs (608). These lights will often be chosen to be of a singular wavelength or range of wavelengths in order to allow birds to see, but prevent the birds from being photo stimulated. It is also possible that in some embodiments, the operator may want to adjust the colour, intensity, and duration of the lights throughout the day. In some embodiments, the lights can be comprised of light emitting diodes, but can also comprise neon, florescent, compact florescent, incandescent, or other lighting technologies as well known to those skilled in the art.

In some embodiments, depending on the nature of the animal to be fed, station (100) operation can be modified during different phases of the animal's life. There can be juvenile and adult modes that can change the way station (100) is controlled, and can further make trade-offs in accuracy while in a juvenile mode to ensure that animal safety is properly accounted for. In some embodiments, the station can provide different feeding bout lengths or alter the amount of feed supplied in feed pan (112), based on age or any other criteria.

In some embodiments, one role of SCADA application and server (1020) is to continuously analyze the feeding data and identify animals that have not eaten within a certain amount of time and flag this for the technician to intervene and evaluate the animal's health and check for injury, illness, or a case of failure to thrive. This information can also help to identify animals with illness and provide an additional way to isolate and treat animals before the illness is spread to the rest of the flock.

In order to train animals to know where to go to get their food, controller (1000) can implement several different training modes. One embodiment of a training protocol is shown in FIG. 9 and is described as follows. The feeding station can be placed in training mode. In training mode, exit doors (108, 104) can be removed, and entrance doors (103, 107) and feed door (124) can be retained in the open position. The animals can then have ad libitum access to feed inside feed pan (112) and, additionally, in supplemental feeders inside station (100) on scale platforms (105, 109), and near entrance (103) or on ramp (130). After 2 to 4 days, the feed outside station (100) can be removed, so that animals learn that they can eat inside station (100). Once the animals have learned to eat from feed pan (112), the supplemental feeders inside station (100) can be removed. The animals can acclimate to the movement of doors by closing and opening feed door (124) periodically at a time interval set by the technician, and topping up feed pan (112) to a desired amount (also set by the user). Measuring the weight of feed pan (112) at the start and end of these intervals can provide a means of recording the feed intake of the animals as a group. After a period of approximately 5 to 14 days, exit doors (108, 104) can be re-installed and entrance doors (103, 107) can be operated to feed birds individually.

From time to time, the stations (100) may require maintenance. In some embodiments, the system can have special modes that can provide the technician with the ability to complete certain function such as open and close entrance doors (103, 107), open and close the feed door (124), run the ejectors (300), or empty feed hopper (111), among others. Additional modes can provide access to individual motors and actuators (1006) to help debug very specific operational issues.

In some embodiments, the feeding station frame (121) can provide for provisions to simplify the movement and placement of the station (100) such as mounting holes for the placement of casters, lift point hooks, fork lift slots, carry handles, cam operated locking wheels, among others. In addition, depending on the animal to be fed, feeding station (100) can comprise provisions for raising and lowering the entire station, or different height platforms might be added to increase and decrease the height. Feeding stations (100) disposed at the opening of entry door (103) of sorting compartment (101) can allow for the attachment of a ramp (130), or for a perch which animals waiting for access to station (100) can use to queue up for entry.

In order to prevent contamination between flocks, stations (100) can be capable of being washed down with a hose and disinfectant, as such all surfaces of the machine must be compatible with commercially available disinfectant products, and can further be sealed from unwanted water or cleaning ingress. In some embodiments, this can mean sealing all surfaces to an IP65 to IP67 rating. The added benefit of this is that it can protect the station from dust ingress as bird and other livestock rearing facilities are often very high in particulate matter and dust.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

REFERENCES CITED

US PATENT DOCUMENTS

| Pat. No. | Date | Author | U.S. Cl. |
|---|---|---|---|
| 2008/0314325 A1 | December 2008 | Hempstead et al. | 119/51.02 |
| 2005/0284382 A1 | December 2005 | Stanchev et al. | 119/51.02 |
| 2010/0263596 A1 | October 2010 | Schumann et al. | 119/51.02 |
| 2006/0249088 A1 | November 2006 | Eu | 119/51.02 |
| 2009/0241840 A1 | October 2009 | Mills | 119/51.02 |
| 2007/0193524 A1 | August 2007 | Turner et al. | 119/51.02 |

-continued

US PATENT DOCUMENTS

| Pat. No. | Date | Author | U.S. Cl. |
|---|---|---|---|
| 2007/0181068 A1 | August 2007 | McKeown | 119/51.02 |
| 2002/0174834 A1 | November 2002 | van den Berg | 119/51.02 |
| 2009/0173282 A1 | July 2009 | Wu et al. | 119/51.02 |
| 2011/0168099 A1 | July 2011 | van Lier et al. | 119/51.02 |
| 2007/0137584 A1 | June 2007 | Travis | 119/51.02 |
| 2009/0133635 A1 | May 2009 | Sie et al. | 119/51.02 |
| 2012/0085288 A1 | April 2012 | Salinas et al. | 119/51.02 |
| 2003/0061996 A1 | April 2003 | Voogd et al. | 119/51.02 |
| 2013/0036977 A1 | February 2014 | Kalnay et al. | 119/51.02 |
| 2014/0000522 A1 | January 2014 | Christensen | 119/51.02 |
| 4,517,923 | May 1985 | Palmer | 119/51 |
| 5,275,131 | April 1994 | Brake et al. | 119/63 |
| 5,673,647 | October 1997 | Pratt | 119/51.02 |
| 6,234,111 B1 | May 2001 | Ulman et al. | 119/54 |
| 6,314,909 B1 | November 2001 | Horwood | 119/51.02 |
| 6,509,375 B1 | January 2003 | Meier et al. | 514/538 |
| 6,868,804 B1 | March 2005 | Huisma et al. | 119/842 |
| 7,040,250 B2 | May 2006 | Cole et al. | 119/53 |
| 7,210,428 B2 | May 2007 | Thibault | 119/842 |
| 7,581,512 B2 | September 2009 | Cole et al. | 119/53 |
| 8,091,507 B2 | January 2012 | Cole et al. | 119/53 |
| 8,584,619 B2 | November 2013 | Eakin et al. | 119/515 |

Foreign Patent Documents

Patent # Date Authorint. Cl.
Pomar, J. and Pomar, C. (2009). "Feeder System for Farm Animals.", International Patent PCT/EP2009/050507, Jan. 16, 2009. (Patent)

Other Publications

Aviagen, 2014. Aviagen research and development: Commercial FCR selection. http://en.aviagen.com/research-development/. Accessed Aug. 4, 2014.

Havenstein, G. B., P. R. Ferket, and M. A. Qureshi. 2003a. Carcass composition and yield of 1957 versus 2001 broilers when fed representative 1957 and 2001 broiler diets. Poult. Sci. 82:1509-1518.

Havenstein, G. B., P. R. Ferket, and M. A. Qureshi. 2003b. Growth, livability, and feed conversion of 1957 versus 2001 broilers when fed representative 1957 and 2001 broiler diets. Poult. Sci. 82:1500-1508.

Havenstein, G. B., P. R. Ferket, S. E. Scheideler, and B. T. Larson. 1994a. Growth, livability, and feed conversion of 1957 vs 1991 broilers when fed typical 1957 and 1991 broiler diets. Poult. Sci. 73:1785-1794.

Havenstein, G. B., P. R. Ferket, S. E. Scheideler, and D. V. Rives. 1994b. Carcass composition and yield of 1991 vs 1957 broilers when fed typical 1957 and 1991 broiler diets. Poult. Sci. 73:1795-1804.

Robinson, F. E., R. A. Renema, L. Bouvier, J. J. R. Feddes, M. J. Zuidhof, J. L. Wilson, M. Newcombe, and R. I. McKay. 1998. Effects of photostimulatory lighting and feed allocation in female broiler breeders. 2. Egg and chick production characteristics. Can. J. Anim. Sci. 78:615-623.

Zuidhof, M. J., B. L. Schneider, V. L. Carney, D. R. Korver, and F. E. Robinson. 2014. Growth, efficiency, and yield of commercial broilers from 1957, 1978, and 2005. Poult. Sci. 93:2970-2982.

Zuidhof, M. J., D. E. Holm, R. A. Renema, M. A. Jalal, and F. E. Robinson. 2015. Effects of broiler breeder management on pullet body weight and carcass uniformity. Poult. Sci. 94:1389-1397.

We claim:

1. A system for feeding an animal, comprising:
   a) a frame;
   b) a feeding compartment operatively coupled to the frame, further comprising a first entry door configured to control access and ingress into the feeding compartment by the animal, and further comprising at least one first exit door configured to provide egress from the feeding compartment by the animal;
   c) a feed delivery system operatively coupled to the feeding compartment and configured to dispense feed to the animal in the feeding compartment;
   d) at least one controller configured to operatively control at least one or more of the first entry door, the at least one first exit door and the feed delivery system; and
   e) the feeding compartment comprising a first ejection mechanism configured to eject the animal from the feeding compartment, and wherein the at least one controller is further configured to operatively control the first ejection mechanism, and wherein the first ejection mechanism comprises a first panel having a range of travel across the feeding compartment to the at least one first exit door, the range of travel of the first panel to the at least one first exit door configured to physically push the animal out of the feeding compartment through the at least one first exit door.

2. The system as set forth in claim 1, further comprising a sorting compartment operatively coupled to the frame and configured to provide access to the first entry door, the sorting compartment further comprising a second entry door configured to control access and ingress into the sorting compartment by the animal, and further comprising at least one second exit door configured to provide egress from the sorting compartment by the animal, and wherein the at least one controller is further configured to operatively control one or both of the second entry door and the at least one second exit door.

3. The system as set forth in claim 2, wherein the sorting compartment comprises a second ejection mechanism configured to eject the animal from the sorting compartment, and wherein the at least one controller is further configured to operatively control the second ejection mechanism.

4. The system as set forth in claim 3, wherein the second ejection mechanism comprises a second panel configured to push the animal out of sorting compartment through the at least one second exit door.

5. The system as set forth in claim 1, wherein the first entry door comprises a restriction mechanism configured to restrict a size of the animal passing therethrough.

6. The system as set forth in claim 2, wherein the second entry door comprises a restriction mechanism configured to restrict a size of the animal passing therethrough.

7. The system as set forth in claim 1, wherein the feeding compartment comprises a first scale configured to weigh the animal.

8. The system as set forth in of claim 1, further comprising a radio frequency identification ("RFID") antenna operatively coupled to the at least one controller, the RFID antenna configured to detect an RFID tag disposed on the animal.

9. The system as set forth in claim 1, wherein the feed delivery system comprises at least one storage bin configured to store the feed, and further comprises a feed dispensing mechanism configured to dispense the feed from the at least one storage bin.

10. The system as set forth in claim 9, wherein the feeding compartment comprises at least one feed receptacle operatively coupled to the feed dispensing mechanism and configured to receive the feed from the at least one storage bin, and wherein each of the at least one feed receptacle further comprises a feed receptacle door configured to restrict access thereto.

11. The system as set forth in claim 1, wherein the feeding compartment comprises a marking system configured to mark the animal.

12. The system as set forth in claim 2, wherein the sorting compartment comprises a second scale configured to weigh the animal.

13. The system as set forth in claim 10, wherein the at least one feed receptacle comprises at least one fixed or removable feed pan configured to receive the feed, the at least one fixed or removable feed pan comprising at least one weight sensor configured for weighing the feed.

14. The system as set forth in claim 1, wherein the controller is disposed in a control panel, the control panel comprising one or more of:
   a) analog and digital input output systems controllers;
   b) a network interface;
   c) a radio frequency identification ("RFID") reader; and
   d) a motor/actuator controller.

15. The system as set forth in claim 14, further comprising one or both of a supervisory control and data acquisition ("SCADA") server and a database server operatively coupled to the controller.

16. The system as set forth in claim 1, further comprising at least one door frame sensor configured for detecting if one or both of the first entry door and the at least one first exit door is blocked by the animal or by debris.

17. The system as set forth in claim 7, wherein the first scale comprises angled edges to prevent the animal from grabbing thereon or getting caught when being ejected from the feeding compartment.

18. The system as set forth in claim 12, wherein the second scale comprises angled edges to prevent the animal from grabbing thereon or getting caught when being ejected from the sorting compartment.

19. The system as set forth in claim 10, wherein the feed receptacle door comprises a feeder reducing plate configured for reducing an opening of the feed receptacle door.

20. The system as set forth in claim 1, wherein the animal comprises poultry.

21. The system as set forth in claim 1, wherein the animal comprises one or both of an individual animal and a group of animals.

22. The system as set forth in claim 2, wherein the sorting compartment further comprises a second ejection mechanism configured to eject the animal from the sorting compartment, and wherein the at least one controller is further configured to operatively control the second ejection mechanism, and wherein the second ejection mechanism comprises a second panel having a range of travel across the sorting compartment to the at least one second exit door, the range of travel of the second panel to the at least one second exit configured to physically push the animal out of the sorting compartment through the at least one second exit door.

23. A method for feeding an animal the method comprising the steps of:
   a) providing a system for feeding the animal, the system comprising:
      i) a frame,
      ii) a feeding compartment operatively coupled to the frame, further comprising a first entry door configured to control access and ingress into the feeding compartment by the animal, and further comprising at least one first exit door configured to provide egress from the feeding compartment by the animal, iii) a feed delivery system operatively coupled to the feeding compartment and configured to dispense feed to the animal in the feeding compartment, iv) at least one controller configured to operatively control at least one or more of the first entry door, the at least one first exit door and the feed delivery system, and v) the feeding compartment comprising a first ejection mechanism configured to eject the animal from the feeding compartment, and wherein the at least one controller is further configured to operatively control the first ejection mechanism, and wherein the first ejection mechanism comprises a first panel having a range of travel from one side to another side of the feeding compartment to the at least one first exit door, the range of travel of the first panel to the at least one first exit door configured to physically push the animal out of the feeding compartment through the at least one first exit door;

b) opening the first entry door to the feeding compartment to provide access and ingress into the feeding compartment by the animal, wherein the feeding compartment is operatively coupled to the frame, and wherein the first entry door is operatively controlled by the at least one controller;

c) dispensing feed from the feed delivery system into the feeding compartment if the animal meets at least one predetermined criteria for receiving the feed, the feed delivery system operatively controlled by the at least one controller: and d) ejecting the animal from the feeding compartment through the at least one first exit door disposed in the feeding compartment if: i) the animal has eaten at least some of the dispensed feed, ii) a predetermined period of time for feeding has expired, or iii) the animal does not meet the at least one predetermined criteria for receiving the feed, wherein the at least one first exit door is operatively controlled by the at least one controller.

24. The method as set forth in claim 23, further comprising the step of restricting access and ingress into the feeding compartment if the animal exceeds a predetermined size.

25. The method as set forth in claim 23, further comprising the step of weighing the animal.

26. The method as set forth in claim 23, further comprising the step of detecting whether the animal has a radio frequency identification ("RFID") tag and identifying the animal if it does.

27. The method as set forth in claim 26, further comprising the step of marking the animal if the animal cannot be identified.

28. The method as set forth in claim 23, further comprising the step of opening a second entry door to a sorting compartment operatively coupled to the frame and to the first entry door to provide access and ingress into the sorting compartment by the animal, wherein the second entry door is operatively controlled by the at least one controller.

29. The method as set forth in claim 28, further comprising the step of ejecting the animal from the sorting compartment through a second exit door disposed in the sorting compartment if the animal does not meet the at least one predetermined criteria for receiving the feed.

30. The method as set forth in claim 28, further comprising the step of restricting access and ingress into the sorting compartment if the animal exceeds the predetermined size.

31. The method as set forth in claim 28, further comprising the step of identifying the animal when the animal is in the sorting compartment.

32. The method as set forth in claim 28, further comprising the step of weighing the animal when the animal is in the sorting compartment.

* * * * *